US012695488B2

(12) United States Patent
Haustein et al.

(10) Patent No.: US 12,695,488 B2
(45) Date of Patent: Jul. 28, 2026

(54) METHODS AND APPARATUS FOR EVALUATING BEHAVIOUR OF COMMUNICATION DEVICE IN VIEW OF ANTENNA PATTERNS THEREOF

(71) Applicant: Fraunhofer-Gesellschaft zur Förderung der angewandten Forschung e.V., Munich (DE)

(72) Inventors: Thomas Haustein, Berlin (DE); Paul Simon Holt Leather, Berlin-Schlachtensee (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 303 days.

(21) Appl. No.: 18/300,565

(22) Filed: Apr. 14, 2023

(65) Prior Publication Data

US 2023/0254052 A1    Aug. 10, 2023

Related U.S. Application Data

(63) Continuation of application No. PCT/EP2021/078491, filed on Oct. 14, 2021.

(30) Foreign Application Priority Data

Oct. 16, 2020    (EP) ..................................... 20202360

(51) Int. Cl.
*H04B 17/16* (2015.01)
*H04B 7/06* (2006.01)
(Continued)

(52) U.S. Cl.
CPC ......... *H04B 7/0617* (2013.01); *H04B 17/102* (2015.01); *H04B 17/16* (2015.01); *H04B 17/19* (2015.01)

(58) Field of Classification Search
CPC .... H04B 7/0617; H04B 7/063; H04B 7/0695; H04B 17/16; H04B 17/19; H04B 17/26;
(Continued)

(56) References Cited

U.S. PATENT DOCUMENTS

2006/0264184 A1* 11/2006 Li ............................ H01Q 3/24
455/562.1
2016/0301506 A1 10/2016 Lucent
(Continued)

FOREIGN PATENT DOCUMENTS

| CN | 105684322 A | 6/2016 |
| CN | 111337919 A | 6/2020 |
| | (Continued) | |

OTHER PUBLICATIONS

Sung-Hyuk Cha, "Comprehensive Survey on Distance/Similarity Measures Between Probability Density Functions", International Journal of Mathematical Models and Methods in Applied Sciences, vol. 1(4), 2007 pp. 300-307.
(Continued)

*Primary Examiner* — Thai Pham
(74) *Attorney, Agent, or Firm* — Bridgeway IP Law Group, PLLC; Jihun Kim

(57) ABSTRACT

A method for evaluating a behaviour of a device comprises obtaining a first dataset representing a first set of values of at least two parameters relating to a first antenna pattern; and obtaining a second dataset representing a second set of values of the at least two parameters relating to a second antenna pattern being formed by the device. The method comprises relating the first dataset and the second dataset using a metric to obtain a relationship. Further, the method comprises evaluating at least a behaviour of the device using the relationship.

14 Claims, 25 Drawing Sheets

(51) Int. Cl.
H04B 17/10 (2015.01)
H04B 17/19 (2015.01)
(58) Field of Classification Search
CPC .. H04B 17/101; H04B 17/102; H04B 17/103;
H01Q 3/00; H01Q 3/267; H01Q 25/00;
H01Q 25/002
See application file for complete search history.

(56) References Cited

U.S. PATENT DOCUMENTS

| | | | | |
|---|---|---|---|---|
| 2019/0049502 | A1* | 2/2019 | Gerbl | H01Q 3/267 |
| 2019/0319363 | A1* | 10/2019 | Ko | H01Q 21/0031 |
| 2020/0191910 | A1 | 6/2020 | Sa | |
| 2020/0205230 | A1* | 6/2020 | Haustein | H04B 7/0617 |

FOREIGN PATENT DOCUMENTS

| | | | |
|---|---|---|---|
| DE | 10303587 A1 | 8/2004 | |
| GB | 2571063 A * | 8/2019 | G01S 11/04 |

OTHER PUBLICATIONS

Simone Santini et al., "Similarity measures," in IEEE Transactions on Pattern Analysis and Machine Intelligence, vol. 21, No. 9, pp. 871-883, Sep. 1999.
S. Chen et al., "The Normalized Similarity Metric and Its Applications," 2007 IEEE International Conference on Bioinformatics and Biomedicine (BIBM 2007), Fremont, CA, 2007, pp. 172-180.
T. Nakamori et al., "3-D Object matching using phase correlation method," IEEE 10th International Conference On Signal Processing Proceedings, Beijing, 2010, pp. 1275-1278.
Huashan Tan et al., "Digital image similarity metrics and their performances," 2011, 2nd International Conference on Artificial Intelligence, Management Science and Electronic Commerce (AIMSEC), Dengleng, 2011, pp. 3922-3925.
Huaqiang Gao et al., "Beam Probability Metric for OTA Testing of Adaptive Antenna Systems in Multi-Probe Anechoic Chamber Setups," 2019, 13th European Conference on Antennas and Propagation (EuCAP), Krakow, Poland, 2019.
Jing Zhang et al., "5G Millimeter-Wave Antenna Array: Design and Challenges," in IEEE Wireless Communications, vol. 24, No. 2, pp. 106-112, Apr. 2017.
Namita Aggarwal, "First and Second Order Statistics Features for Classification of Magnetic Resonance Brain Images". Journal of Signal and Information, 2012, 3, 146-153.
IEEE Std 145-1979, "Antenna-Range Measurements of Radiation Patterns".
Hamed Niroumand et al., "Statistical Methods for Comparison of Data Sets of Construction Methods and Building Evaluation", 2nd Cyprus International Conference on Educational Research, CY-ICER 2013.
3GPP TS 38.101-2, Version 16.4.0, "NR; User Equipment (UE) radio transmission and reception; Part 2: Range 2 Standalone", Jul. 2020.
Zhengping Chang, "Office Action for Chinese Application No. 202180079801.X" dated Apr. 15, 2026, CNIPA, China.

* cited by examiner

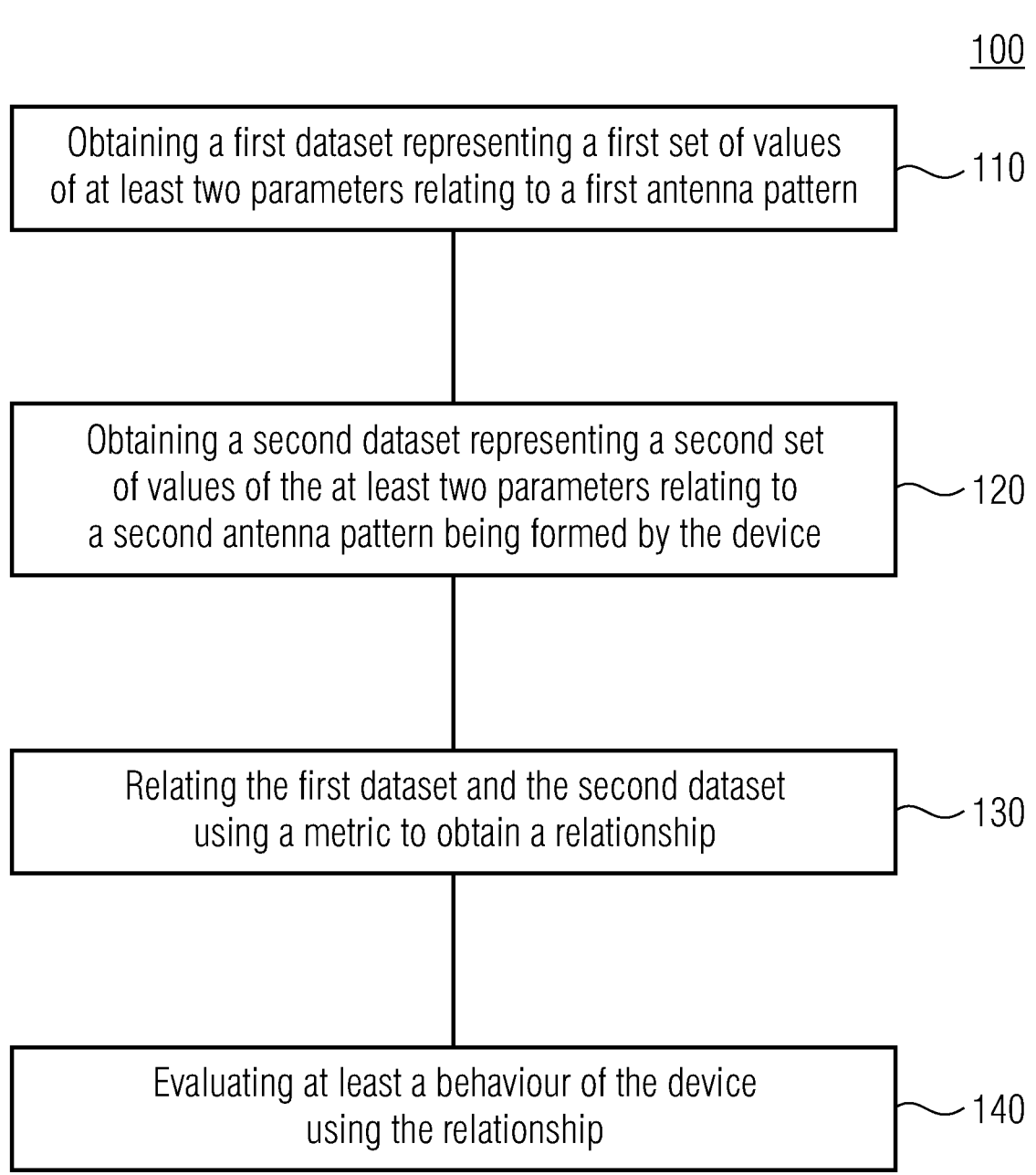

100

Obtaining a first dataset representing a first set of values of at least two parameters relating to a first antenna pattern — 110

Obtaining a second dataset representing a second set of values of the at least two parameters relating to a second antenna pattern being formed by the device — 120

Relating the first dataset and the second dataset using a metric to obtain a relationship — 130

Evaluating at least a behaviour of the device using the relationship — 140

Fig. 1

50
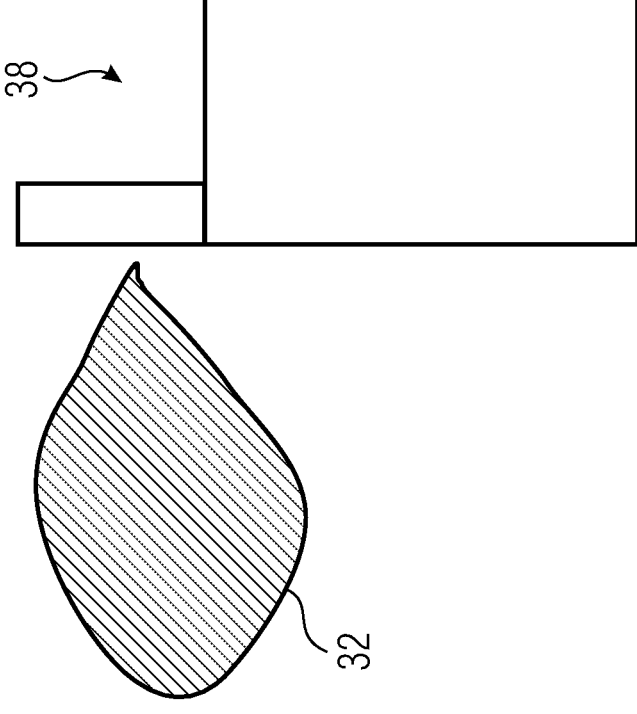
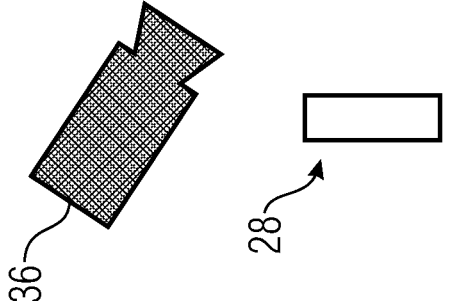
Fig. 5

600

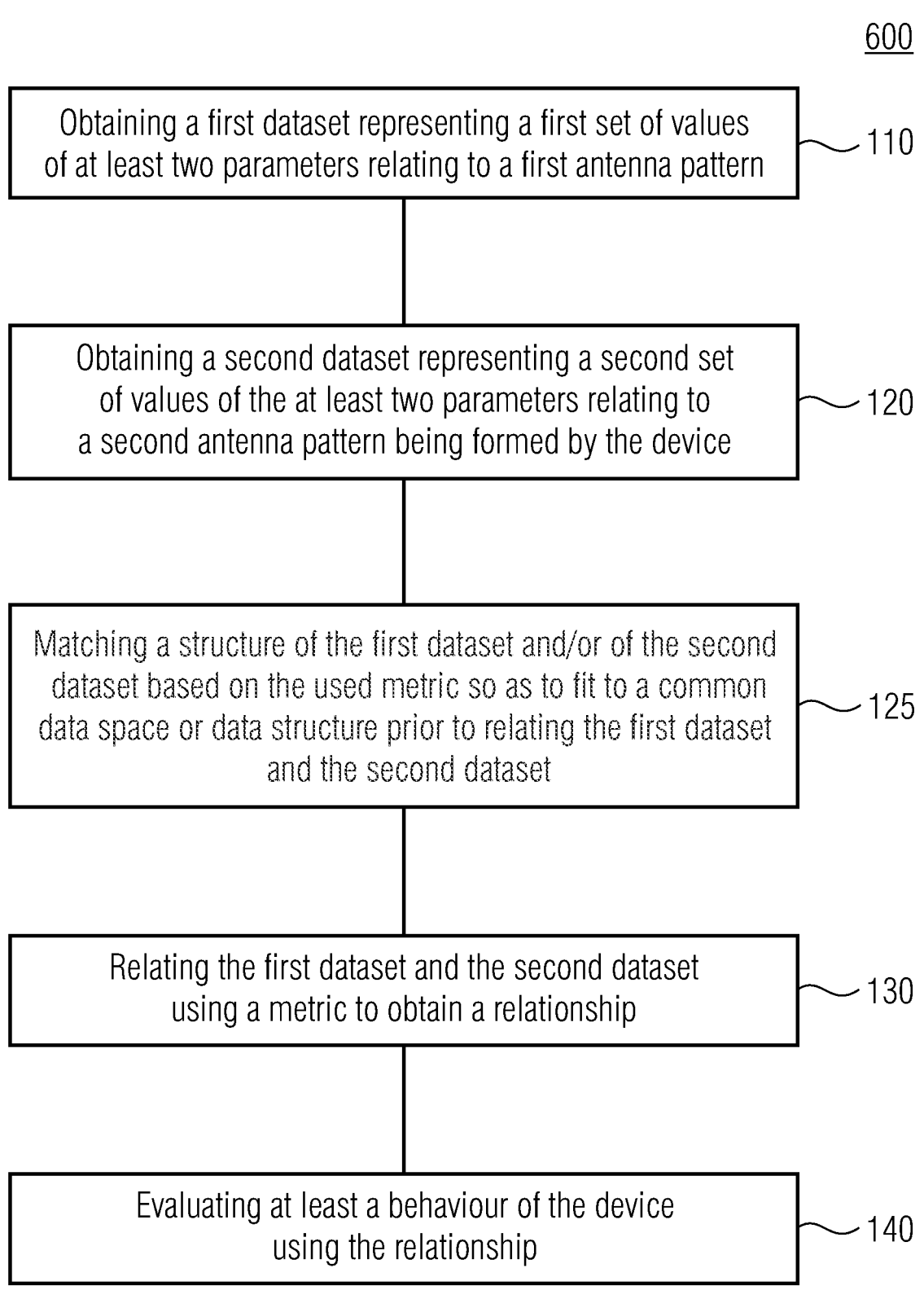

Obtaining a first dataset representing a first set of values of at least two parameters relating to a first antenna pattern — 110

Obtaining a second dataset representing a second set of values of the at least two parameters relating to a second antenna pattern being formed by the device — 120

Matching a structure of the first dataset and/or of the second dataset based on the used metric so as to fit to a common data space or data structure prior to relating the first dataset and the second dataset — 125

Relating the first dataset and the second dataset using a metric to obtain a relationship — 130

Evaluating at least a behaviour of the device using the relationship — 140

Fig. 6

| goal | kind of data | |
|---|---|---|
| | parametric | non-parametric |
| compare one group with a hypothetical value | one-sample t-test | Wilcoxon test |
| compare two unpaired groups | unpaired t-test | Man-Whitney test |
| compare two paired groups | paired t-test | Wilcoxon test |
| compare three or more unpaired groups | one-way ANOVA | Kruskal-Wallis test |
| compare three or more paired groups | repeated measures ANOVA | Friedman test |
| quantify association between two data groups | pearson correlation | Spearman correlation |
| predict value from another variable | simple regression | nonparametric regression |
| predict value from several variables | multiple regression | - |

Fig. 7

| beam pair example number | device A | | device B | | see for example Figure |
|---|---|---|---|---|---|
| | TX beam ID | RX beam ID | TX beam ID | RX beam ID | |
| A | 1 | 1 | - | - | 11 |
| B | 1 | - | - | 1 | 12, 13 (device C replaces B) |
| C | - | 1 | 1 | - | 12, 13 (device C replaces B) |
| D | - | - | 1 | 1 | 11 |
| E | 1 | 1 | 1 | 1 | 12, 13 (device C replaces B) |
| F | 2 | 2 | 12 | 12 | 14 |
| G | 2 | 2 | 11 | 11 | 15 (device C replaces B) |
| H | 1 | 1 | 1 | 1 | 16 |
| I | 2 | 2 | 2 | 2 | 17 |
| J | 1 | 1 | 1 | 1 | 18 |
| K | 12 | 12 | 12 | 12 | 19 |

Fig. 17

| index no. [Figure no.] | rotation [a] | beamformer tuning | PCC assignment | SCC assignment | EIRP difference |
|---|---|---|---|---|---|
| 1 (Fig.18) | 0° | $f_1$ | $f_1$ | $f_1$ | $D_1$ |
| 2 (Fig.19) | 15° | $f_1$ | $f_1$ | $f_2$ | $D_2$ |
| 3 (Fig.20) | 30° | $f_1$ | $f_1$ | $f_2$ | $D_3$ |
| 4 (Fig.21) | 15° | $f_2$ | $f_2$ | $f_1$ | $D_4$ |
| 5 (Fig.22) | 30° | $f_2$ | $f_2$ | $f_1$ | $D_5$ |

Fig. 23a

| index no. | compare |
|---|---|
| 1 | Is $D_1 = D_2$? |
| 2 | Is $D_1 = D_3$? |
| 3 | Is $D_1 = D_4$? |
| 4 | Is $D_1 = D_5$? |
| 5 | Is $D_2 = D_4$? |
| 6 | Is $D_3 = D_5$? |

Fig. 23b

| index no. [Figure no.] | rotation [a] | beamformer tuning | PCC assignment | SCC assignment | EIRP f$_1$ | EIRP f$_2$ | EIRP difference |
|---|---|---|---|---|---|---|---|
| 1 (Fig.18) | 0° | f$_1$ | f$_1$ | f$_1$ | P1(f$_1$) | P1(f$_2$) | $\Delta_1 = $ P1(f$_1$)-P1(f$_2$) |
| 2 (Fig.19) | 15° | f$_1$ | f$_1$ | f$_2$ | P2(f$_1$) | P2(f$_2$) | $\Delta_2$ |
| 3 (Fig.20) | 30° | f$_1$ | f$_1$ | f$_2$ | P3(f$_1$) | P3(f$_2$) | $\Delta_3$ |
| 4 (Fig.21) | 15° | f$_2$ | f$_2$ | f$_1$ | P4(f$_1$) | P4(f$_2$) | $\Delta_4$ |
| 5 (Fig.22) | 30° | f$_2$ | f$_2$ | f$_1$ | P5(f$_1$) | P5(f$_2$) | $\Delta_5$ |

Fig. 24

| index no. | compare | potential insights derived |
|---|---|---|
| 1 | Is $\Delta_1 = \Delta_2$? | How much beam squinting depends on the angle off bore sights? |
| 2 | Is $\Delta_1 = \Delta_3$? | Does the beam squinting effect grows linear or with the rising angle? |
| 3 | Is $\Delta_1 = \Delta_4$? | |
| 4 | Is $\Delta_1 = \Delta_5$? | |
| 5 | Is $\Delta_2 = \Delta_4$? | If not equal, one frequency may be more suited as the reference (PCC) than the other |
| 6 | Is $\Delta_3 = \Delta_5$? | If not equal, one frequency may be more suited as the reference (PCC) than the other<br>Is the imbalance with respect to performance loss rising of decreasing with increasing off bore sight angle? |

Fig. 25

METHODS AND APPARATUS FOR EVALUATING BEHAVIOUR OF COMMUNICATION DEVICE IN VIEW OF ANTENNA PATTERNS THEREOF

CROSS-REFERENCE TO RELATED APPLICATIONS

This application is a continuation of copending International Application No. PCT/EP2021/078491, filed Oct. 14, 2021, which is incorporated herein by reference in its entirety, and additionally claims priority from European Application No. 20202360.2, filed Oct. 16, 2020, which is incorporated herein by reference in its entirety.

BACKGROUND OF THE INVENTION

The present application concerns the field of wireless communication systems, networks and devices, more specifically, the evaluation of antenna patterns so as to evaluate the behaviour of a device. In particular, the present application concerns methods and apparatus to compare antenna radiation patterns numerically. The inventors have found that currently, there are only insufficient means to evaluate the behaviour of a device in view of the antenna patterns it forms. An example for a known procedure is cited from 3GPP TS 38.101-2, version 16.4.0 in which the method of calculating beam correspondence for a power class 3 UE is specified.

6.6.4 Beam Correspondence for Power Class 3

6.6.4.1 General

The beam correspondence requirement for power class 3 UEs consists of three components: UE minimum peak EIRP (as defined in Clause 6.2.1.3), UE spherical coverage (as defined in Clause 6.2.1.3), and beam correspondence tolerance (as defined in Clause 6.6.4.2). The beam correspondence requirement is fulfilled if the UE satisfies one of the following conditions, depending on the UE's beam correspondence capability IE beamCorrespondenceWithoutUL-BeamSweeping, as defined in TS 38.306 [14]:

If beamCorrespondenceWithoutUL-BeamSweeping is supported, the UE shall meet the minimum peak EIRP requirement according to Table 6.2.1.3-1 and spherical coverage requirement according to Table 6.2.1.3-3 with its autonomously chosen UL beams and without uplink beam sweeping. Such a UE is considered to have met the beam correspondence tolerance requirement.

If beamCorrespondenceWithoutUL-BeamSweeping is not present, the UE shall meet the minimum peak EIRP requirement according to Table 6.2.1.3-1 and spherical coverage requirement according to Table 6.2.1.3-3 with uplink beam sweeping. Such a UE shall meet the beam correspondence tolerance requirement defined in Clause 6.6.4.2 and shall support uplink beam management, as defined in TS 38.306 [14].

6.6.4.2 Beam Correspondence Tolerance for Power Class 3

The beam correspondence tolerance requirement $\Delta EIRP_{BC}$ for power class 3 UEs is defined based on a percentile of the distribution of $\Delta EIRP_{BC}$, defined as $\Delta EIRP_{BC}=EIRP_2-EIRP_1$ over the link angles spanning a subset of the spherical coverage grid points, such that EIRP$_1$ is the total EIRP in dBm calculated based on the beam the UE chooses autonomously (corresponding beam) to transmit in the direction of the incoming DL signal, which is based on beam correspondence without relying on UL beam sweeping.

EIRP$_2$ is the best total EIRP (beam yielding highest EIRP in a given direction) in dBm which is based on beam correspondence with relying on UL beam sweeping.

The link angles are the ones corresponding to the top $N^{th}$ percentile of the EIRP$_2$ measurement over the whole sphere, where the value of N is according to the test point of EIRP spherical coverage requirement for power class 3, i.e. N=50.

For power class 3 UEs, the requirement is fulfilled if the UE's corresponding UL beams satisfy the maximum limit in Table 6.6.4.2-1.

TABLE 6.6.4.2-1

| UE beam correspondence tolerance for power class 3 | |
| --- | --- |
| Operating band | Max $\Delta EIRP_{BC}$ at $85^{th}$ %-tile $\Delta EIRP_{BC}$ CDF (dB) |
| n257 | 3.0 |
| n258 | 3.0 |
| n259 | 3.2 |
| n260 | 3.2 |
| n261 | 3.0 |

NOTE:
The requirements in this table are verified only under normal temperature conditions as defined in Annex E.2.1

Such a metric provides for only insufficient information that does not allow to precisely evaluate a device.

Thus, there is a need to provide for reliable methods and apparatus for evaluating a behaviour of a device in wireless communications.

This need is addressed by the embodiments described herein. The inventors have found that by formulating and using a metric that combines at least two parameters of a first antenna pattern, a second antenna pattern respectively, a more precise information may be obtained such that the evaluation of the procedure may be precisely determined.

SUMMARY

According to an embodiment, a method for evaluating a behaviour of a device may have the steps of: obtaining a first dataset representing a first set of values of at least two parameters relating to a first antenna pattern; obtaining a second dataset representing a second set of values of the at least two parameters relating to a second antenna pattern being formed by the device; relating the first dataset and the second dataset using a metric to obtain a relationship; and evaluating at least a behaviour of the device using the relationship; wherein evaluating the behaviour is performed at: the device; a part of a test and measurement equipment; a different node having information about the first antenna pattern and the second antenna pattern; and/or at a network controller; wherein the evaluating relates to a selection of a beam pattern to be formed to optimize a link performance according to a criterion.

Another embodiment may have a network node including an antenna unit and being configured for communicating in a wireless communication network using beamforming and using the antenna unit; wherein the network node is to generate a first antenna pattern to communicate with a communication partner wherein the network node is to receive a feedback signal including information indicating a relationship between the first antenna pattern and a reference pattern; wherein the network node is to select a different second antenna pattern based on the feedback signal.

Another embodiment may have a device being implemented to execute the inventive method.

According to an embodiment, a method for evaluating a behaviour of a device comprises obtaining a first dataset representing a first set of values of at least two parameters relating to a first antenna pattern and obtaining a second dataset representing a second set of values of the at least two parameters relating to a second antenna pattern. The second antenna pattern is formed by the device. The method further comprises relating the first dataset and the second dataset using a metric to obtain a relationship. Further, at least a behaviour of the device is evaluated using the relationship, i.e., the outcome of the metric.

The behaviour of the device may be evaluated or judged, for example, as a reference, e.g., in a measurement environment so as to judge whether the device or devices of a same class, type, or other implementation operate in accordance with certain expectations or criteria. Alternatively or in addition, a metric in accordance with embodiments may also be applied in the field, i.e., in a deployment scenario in which the device actively communicates, e.g., in a wireless communications network. Based on the evaluation, the operation of the device may be adjusted and/or operations of other entities of the wireless communication network may be adopted.

BRIEF DESCRIPTION OF THE DRAWINGS

Embodiments of the present invention will be detailed subsequently referring to the appended drawings, in which:

FIG. 1 shows a schematic flow chart of a method according to an embodiment;

FIG. 5 is a schematic block diagram of a measurement environment according to an embodiment;

FIG. 6 shows a schematic block diagram of a method according to an embodiment, comprising matching of datasets;

FIG. 7 is an example table showing an overview of some of the common statistical methods that can be used to compare sets of data in accordance with embodiments;

FIG. 17 is a table to summarize the permutations visualized in FIGS. 8 to 16;

FIG. 23a shows an example summary of the examples presented in FIGS. 18 to 22;

FIG. 23b shows an example of the comparisons made from the measurements detailed in the table of FIG. 23a;

FIG. 24 shows an example table containing a summary of the examples presented in FIGS. 18 to 22; and FIG. 25 shows a schematic example table of comparisons made from the measurements detailed in the table of FIG. 24.

DETAILED DESCRIPTION OF THE INVENTION

Figure 2:
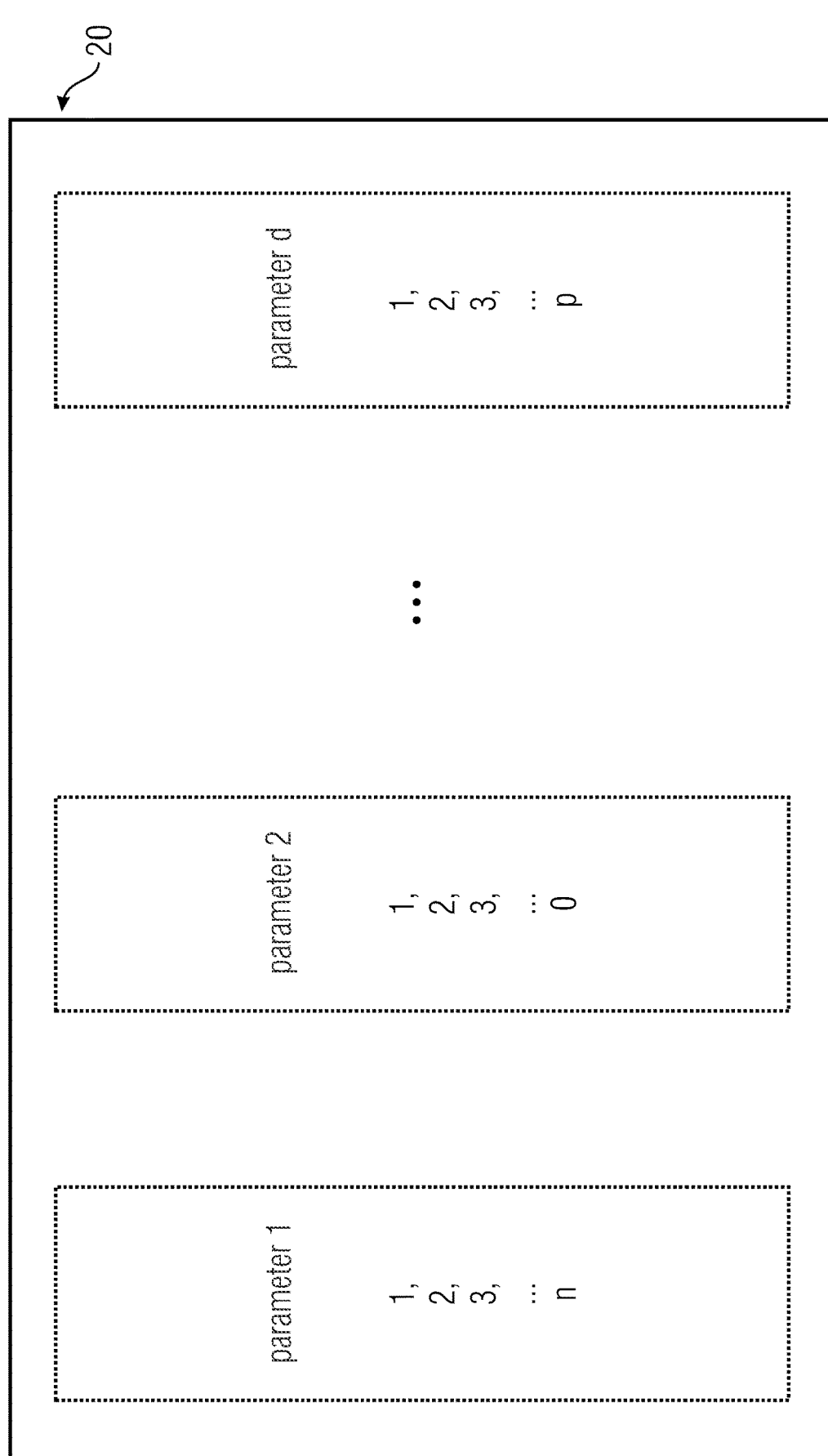
FIG. 2 is a schematic block diagram of a representation of a dataset in accordance with embodiments.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practised without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described herein relate to relating datasets by use of a metric. A dataset may be understood as a set of n values, each value relating to a parameter, e.g., a physical quantity such as a power, an equivalent isotropic radiated power, EIRP, a temperature, a sensitivity or a gain or the like. Although some embodiments are described in connection with evaluating or judging an antenna pattern that is formed so as to transmit energy, e.g., as a transmission radiation pattern, embodiments are not limited hereto, but also apply without any limitation, to antenna patterns that are used for reception, e.g., reception antenna patterns.

In view of the metric being mentioned in connection with known concepts, amongst others, the following deficiencies have been noted by the inventors when measuring, for example, beam correspondence:

no main lobe direction is made;

no antenna beamwidth assessment is made;

no sidelobe position and strength measurement is made; and no null position and depth are tested.

If measured and recorded, the above characteristics could be used to provide information for null steering which in turn could be used for interference avoidance or cancellation. A further limitation of the current SOTA standardization specification TS 38.101-2 (which also relates to beam correspondence), concerns carrier aggregation for which the assessment of not only a first beam but also a second beam might be needed.

Presently, the specification defines:

6.6A Beam Correspondence for CA

For intra-band CA in FR2, the same beam correspondence relationship for beam management is supported across CCs in Rel-15 and no requirement is specified. Beam correspondence performance for intra-band CA is fulfilled if the beam correspondence requirements defined in clause 6.6 is met for non-CA case.

Amongst this, there is written that beam correspondence performance for intra-band CA is fulfilled if the beam correspondence requirements defined in clause 6.6 is met for non-CA case.

Thus, the current specification assumes that the difference between the characteristics of a first component carrier beam and the characteristics of a second component carrier beam when used for intra-band carrier aggregation is negligible. While this may be true for antenna patterns with a lower directivity and where the frequency separation between the component carriers is relatively small, it is unlikely that such conditions are applicable to antenna patters with a higher directivity or where the frequency separation between the component carriers is relatively large. The inventors are therefore of the opinion that the current assumption used in standardization is incorrect. Therefore, the assumption used that beam correspondence for each of the aggregated component carriers is fulfilled when operated stand-alone without CA, beam correspondence would hold for the CA case as well, has to be concluded as inadequate or wrong. This is due to the metric used for the assessing the beam correspondence criterion in the single CC case, wherein the EIRP of the beam autonomously selected by the device and measured at the link antenna in LOS is within a 3 dB margin below the max EIRP of the same beam when measured by a full scan. Statistically, in 85% of spherical coverage this to be fulfilled.

Performing the same test with a multitude of aggregated CC where the multitude of CCs is passing through the same antenna array, beam squinting will create a performance degradation of the aggregated CCs. Such performance degradation has to be considered when defining the values x % and delta-dB for each or all CC is the CA case. The inventors have further found that with the utilization of massive multiple-input multiple-output (MIMO) and millimetre-wave (mmWave) technologies in 5G communications, over-the-air (OTA) testing for 5G antenna systems has become a strong need because conducted testing is no longer applicable. New OTA testing metrics are required to evaluate new performance of 5G antenna systems.

Multiple-input and multiple-output (MIMO) techniques have been used in mobile radio communications since the advent of fourth generation (4G) systems. MIMO is also used in 5G systems and is expected to be used in systems beyond 5G including, for example, 6G. In its simplest form, and considering a paired communication only, one side of the MIMO link prepares and distributes (or multiplexes) a variety of signals for transmission while at the other side or end of the MIMO link, the multiplicity of received signals is collected and combined (demultiplexed). It is thus needed to equip each MIMO-enabled networking device with a plurality of transmission chains and reception chains wherein each chain comprises antennas, radios and further signal processing functions. In order to test and measure the antennas used in such devices, and especially to compare one antenna to another, performance and conformance assessment measures are required. The provision of such assessment measures—hereafter referred to as metrics—is described herein for both single and multiple beam pairs.

Known concepts are limited in that they effectively consider only a single input and single output (SISO) configuration wherein beamformers and antenna arrays are used to create antenna patterns or virtual antennas. Ambiguities could thus be created when the transmitter uses more than one beam (at the same time) and/or the receiver uses more than one beam (at the same time) and/or the transmit antenna and the receive antenna are not co-located and cannot therefore apply collaborative signal processing techniques. Examples include target and victim gNBs.

To reliably improve the performance of a communication link existing between two or more network connected devices, an accurate assessment or measurement of the operation of the links between those devices is needed. If the assessment of link performance is either inaccurate or otherwise limited, then it becomes more difficult to improve link performance. It is therefore beneficial to use the appropriate measures and metrics to both reliably and accurately determine link performance especially when using MIMO-type systems. Known concepts are, thus, insufficiently developed and therefore incapable of providing such metrics and therefore limits the performance optimization of both the link and the overall network.

FIG. 1 shows a schematic flow chart of a method 100 according to an embodiment. In 110, a first dataset representing a first set of values of at least two parameters relating to a first antenna pattern is obtained. In 120, a second dataset representing a second set of values of the at least two parameters relating to a second antenna pattern being formed by the device is obtained. In 130, the first dataset and the second dataset are related to each other using a metric so as to obtain a relationship, i.e., an outcome or result of the metric being applied. In 140, the behaviour and/or additional properties of the device are evaluated using the relationship.

At least one of the two parameters may be related to at least one of:

a width of the second antenna pattern;

a width of a main lobe of the second antenna pattern;

a width of a sidelobe of the second antenna pattern;

a width of a null of the second antenna pattern;

an absolute direction of at least a part of the second antenna pattern a relative direction of at least a part of the second antenna pattern a polarisation of at least a part of the second antenna pattern.

That is, also both parameters may be from this list. Further, corresponding parameters may be used for the first antenna pattern. Alternatively or in addition, a parameter may also be a combination of the above.

Beyond the behaviour of the device, further properties of the device may be evaluated. For example, the behaviour may be understood as being related to describe a device performance, there may be defined device parameters that do not describe device behaviour but are, however, of interest for an evaluating entity. Generally speaking, when a communication device (e.g., a basestation or a UE) is tested, it is the performance (and hence behaviour) of the device that is being tested in embodiments described herein. When relating to so-called non-performance parameters of device to be tested, then these may include, for example, physical dimensions (e.g., mass, length, width, thickness); colour; a hardness of coating/finish/screen; a reliability of connectors; a ruggedness (drop test on faces, corners and edges); environmental parameters (e.g., water resistant, dust resistant, chemical resistant (oils, fats, acids, alkalis)), etc.

FIG. 2 is a schematic block diagram of a representation of a dataset 20 in accordance with embodiments. Datasets to be compared or related by use of a metric may incorporate values of two or more parameters, e.g., a number of d parameters, d being at least 2, at least 3, at least 4, at least 5 or higher. For each parameter a same or different number of values, e.g., n, o, p may be part of dataset 20, wherein n, o, p have a value of at least 1, but incorporate a higher number of at least 2, at least 5, at least 10 or even more. The dataset 20 may relate to an antenna pattern, i.e., a transmission, Tx, pattern or a reception, Rx, pattern. Parameters may relate or incorporate one or more of:

equivalent isotropic radiated power, EIRP;

a power, a position or location, e.g., of a specific part of the antenna radiation pattern such as a main lobe, a side lobe and/or a null;

a polarization of power a combined power level of at least a first and a second polarization;

an electrical field strength;

a magnetic field strength;

a phase;

In other words, in addition to measuring the power of the pattern at a given position or location (e.g., in order to assess a specific part according to the examples given), measurements may relate to a power associated with a defined polarization. Alternatively or in addition, the total power of more than one, e.g., all polarizations can be measured. Furthermore, measurements may also relate to measure field strength where this could either the electric field strength and/or the magnetic field strength. Similarly, such field strength measurements could be measured for given polarizations. Yet a further example is the inclusion of phase measurement since this is a component (or parameter) of the radiation pattern. Any combination of such parameters is included in the embodiments.

As well as measuring a parameter of the antenna pattern at a given position or location, parameters can be measured at different: frequencies; times; power levels; signal bandwidths; signal types (modulation, duty cycle and/or peak-to-average power ratio (crest factor)) and so on.

When measuring a parameter as a function of frequency, the latter may coincide exactly with the operating frequency—or in other words at the fundamental—or it may be at a harmonic or sub-harmonic frequency (a rational integer multiple of the fundamental). This applies to using a single frequency or a multiple number of frequencies for measurement excitation in which the fundamentals, sub-harmonics and harmonics of the excitation tones should be considered. In additional, when either multiple tone or modulate signals are used for excitation—in other words, the signal is possibly not Dirac-like in the frequency domain— the frequencies of the intermodulation (IM) products may also be considered according to some requirement of the order of the IM products to be measured.

Parameters of a dataset may relate to same or different physical quantities such as a power. For example, two parameters may relate to a same physical quantity such as a power or an EIRP, but may relate to different properties thereof such that the physical quantity associated with the first property may form one parameter and the same quantity associated with a different property may form a different parameter. For example, the first property and/or at least a second property may differ from each other by at least one of:

a direction of the physical quantity in space;

a polarization of the physical quantity;

a frequency or frequency range of the physical quantity;

a measurement rate of the physical quantity;

a measurement resolution of the physical quantity;

a measurement grid of the physical quantity;

a power level associated with and/or causing the physical quantity;

a phase a combination thereof

When referring, for example, to the power level associated with and/or causing the physical quantity and when considering an electronically steered antenna comprising at least one or more power amplifiers used for transmission, the transmitted power level may affect a physical quantity of the radiation pattern due to, for example, non-linear electronic effects. Similarly, for reception where at least one or more low-noise amplifiers are used in the receiver, and where the gain is set according to a received power level, other (linear or non-linear) electronic effects could affect the way in which a physical quantity is observed such that, in effect, the physical quantity is perceived to be affected by a power level.

In view of a phase measurement, the first and second properties may be measured with a different phase. For example, it may not be possible or convenient to ensure that two or more carrier frequencies are locked in frequency, time and phase.

Figure 3:
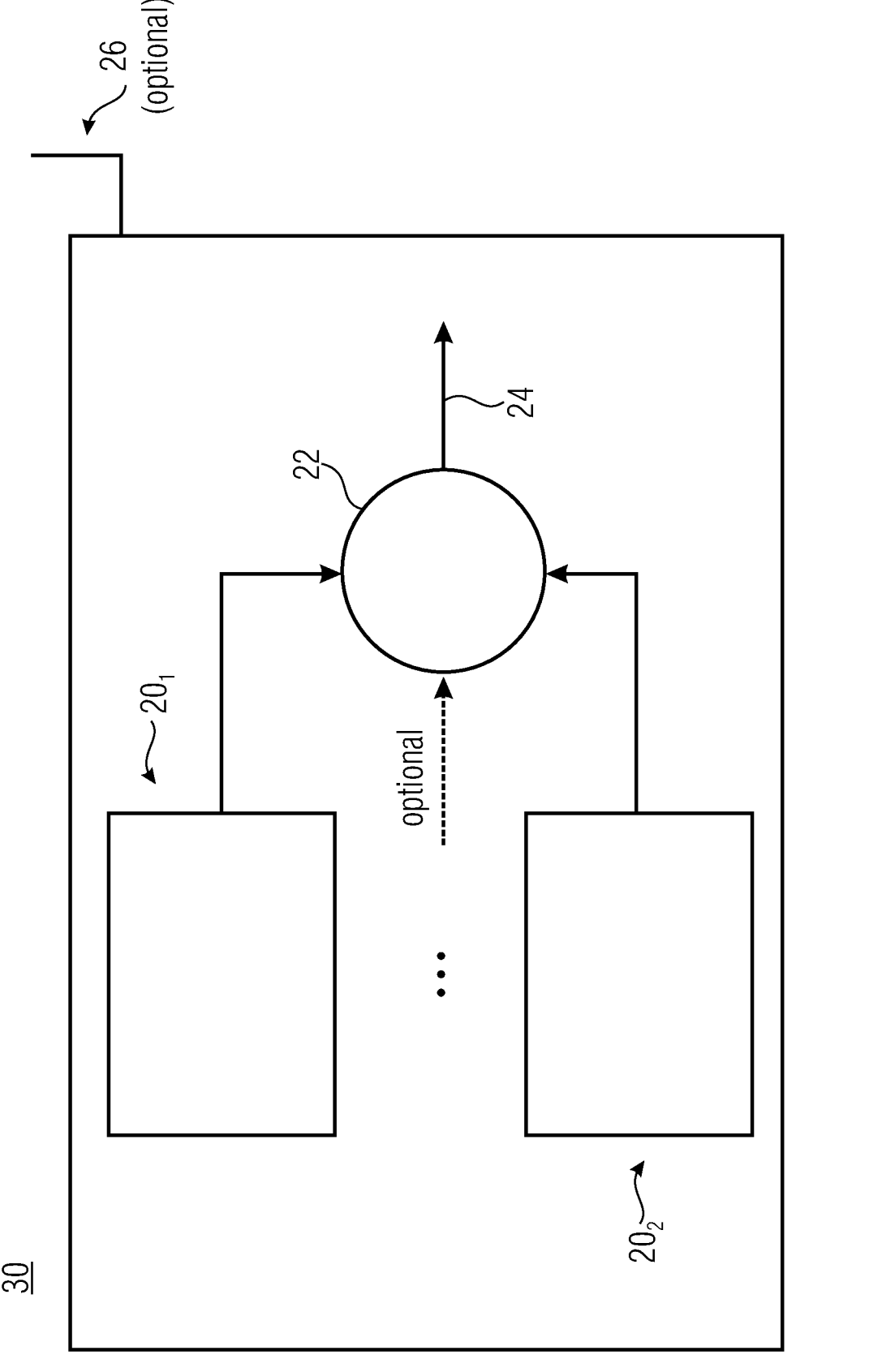
FIG. 3 is a schematic block diagram of an apparatus according to an embodiment which is implemented for executing a method in accordance with the embodiments described herein.

FIG. 3 is a schematic block diagram of an apparatus 30 according to an embodiment. Apparatus 30 may be implemented for executing a method in accordance with the embodiments described herein, e.g., method 100.

Device 30 may be, for example, a network node and/or a part of a measurement environment.

Device 30 may be configured for obtaining at least two datasets $20_1$ and $20_2$, optionally a higher number of at least 3, at least 4, at least 5 or even larger numbers of datasets. By use of a metric 22, the datasets $20_1$ and $20_2$ may be related with each other so as to obtain a relationship 24, i.e., a result, e.g., meaning a quantity or a number or the like. The relationship 24 may provide for a basis for evaluating and/or judging at least the behaviour of a device, which has generated at least one of the antenna patterns to which the dataset $20_1$ or $20_2$ relates.

Optionally, device 30 may comprise a wireless interface 26 for receiving and/or generating an antenna pattern, e.g., a Tx pattern and/or an Rx pattern. The metric 22 may be, for example, at least one of:

a sample mean providing a first mean value of a parameter of the first dataset and a second mean value of the parameter of the second dataset, so as to relate the first mean value and the second mean value;

a sample variance providing a variance value of values of a parameter of the second dataset in relation to values of the parameter in the first dataset;

a sample standard variation providing a standard variation value of values of a parameter of the second dataset in relation to values of the parameter in the first dataset;

a distribution of a sample mean providing for a distribution value of values of the parameter compared to a mean value of the parameter a hypothesis testing a similarity measure providing for a similarity value indicating a similarity between the first dataset and the second dataset a dissimilarity measure providing for a dissimilarity value indicating a dissimilarity between the first dataset and the second dataset a distance measure providing for a distance value indicating a distance between the first dataset and the second dataset a power distribution function providing for a probability distribution function, PDF a cumulative distribution function, CDF However, combinations thereof and/or other metrics may be used to relate two or more datasets with each other. With regard to the described physical quantities, it is, for example, possible to relate two beam patterns that are generated at the same frequency and created in symmetry around a particular direction pointing to a link antenna or a communication partner. The metric may allow to access symmetry properties like the angle between the maximum EIRP in the reference direction and the maximum EIRP in the measured direction. Alternatively or in addition, a halfpower beamwidth in a certain direction may be evaluated. Alternatively or in addition, the beam patterns may be provided at a different frequency or frequency range when compared to each other.

With regard to metrics such as a hypothesis testing, for example, an evaluation may be performed according to a hypothesis like an assumption that the antenna pattern does not fit a predefined criterion, because a temperature is out of a predefined temperature range, e.g., too high or too low when compared to a maximum temperature, a minimum temperature, respectively. Thus, the metric 22 may allow for complex assessments of the datasets.

Device 30 may, thus, relate to a network node being adopted for wireless communication, e.g., in a wireless communication network. Alternatively or in addition, device 30 may form at least a part of a system or measurement system to execute the method.

Figure 4:
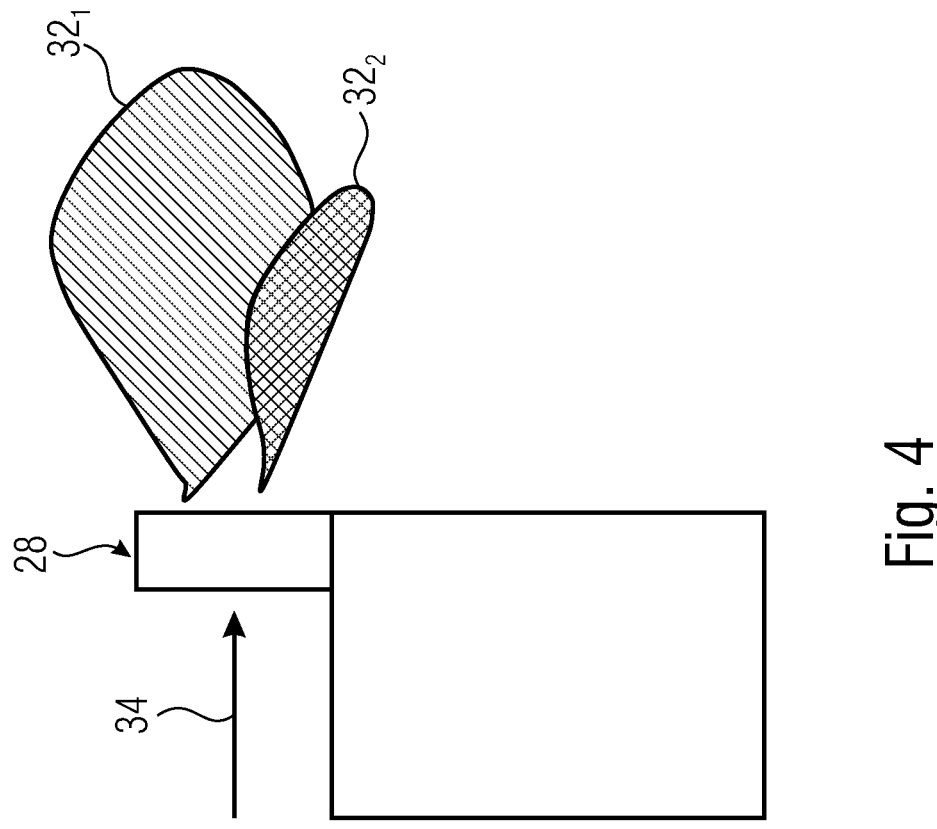
FIG. 4 is a schematic block diagram of a network node according to an embodiment, comprising an antenna unit to allow for a beam forming in a wireless communication network by use of the antenna unit.

FIG. 4 is a schematic block diagram of a network node 40 according to an embodiment. Network node 40 may comprise an antenna unit 28, e.g., an antenna array, one or more antenna patterns or the like so as to allow for a beam forming in a wireless communication network by use of the antenna unit 28. For example, the antenna unit 28 may be the antenna 26 of device 30 and/or comprise at least some of the functionality described therein. The network node may generate a first antenna pattern $32_1$ to communicate with a communication partner, e.g., a transmission beam pattern and/or a reception beam pattern. The network node may receive a feedback signal 34, e.g., using the antenna unit 28 and/or a different interface so as to receive signal 34 with or without a wire (i.e., wirelessly). The feedback signal 34 may be received, for example, from the communication partner or a different entity of the wireless communication network. The feedback signal 34 may include information indicating a relationship between the first antenna pattern and a reference pattern or pattern reference, for example, in view of a normative-actual value comparison, i.e., a comparison between a desired antenna radiation pattern and a radiation pattern being actually generated as the pattern $32_1$. Network node 40 may select a different antenna pattern $32_2$ based on the feedback signal 34 and may generate antenna pattern $32_2$ instead of or in addition to antenna radiation pattern $32_1$.

As described, the antenna patterns $32_1$ and $32_2$ may differ from each other in view of their transmission and/or reception-property or proposed, the pattern itself and/or a frequency range in which they are applied.

For example, when comparing, according to an example, the maximum EIRP with the EIRP in a certain direction, having a ratio as a measurable parameter and a metric as a distribution function of this ratio over the whole or a half sphere or the like, a conformity threshold may be, e.g., a predefined value such as a 3 dB difference. A criterion might be that the 3 dB difference should not happen to more than 65% of all directions or the like. This may mean that some evaluations may be performed without a reference pattern comparison. According to such examples, all devices complying with the above criterion are considered conforming to the test. That is, each evaluated device may provide for a dataset that is combined in the metric.

The feedback signal may be received directly or indirectly from a different network node suffering, for example, from interference generated by the network node. For example, the other node may perceive interference because of being along a different direction when compared to a desired communication partner and may suffer from the interference based to a misalignment of the antenna radiation pattern, a too large or too low power on one or more transmission, change of the antenna unit 28, or other reasons.

Alternatively or in addition, network node 40 may receive the feedback signal 34 directly or indirectly from a network node with which it performs communication. The feedback signal 34 may be an indicator to change the antenna pattern. For example, the change of the antenna pattern may indicate, for example, to use a wider or narrower beam, a higher or lower power and/or a different position of at least one of a null and a main lobe or a side lobe of the antenna pattern. For example, the partner may receive a signal that is stronger than required and may, thus, request a reduction in EIRP. While such a reduction may be obtained by reducing a transmit power, it may also be achieved by reducing directivity (e.g., broadening the beam). Furthermore, when considering a device which is receiving a sufficiently strong signal and is moving, e.g., with high speed, or knows that it will be moving, e.g., with high speed, a broader rather than a narrow beam may be advantageous to simplify beam management procedures, thereby, such a request may be indicated in feedback signal 34.

FIG. 5 is a schematic block diagram of a measurement environment 50 according to an embodiment. Measurement environment 50 may, at least, comprise a link antenna 36 and/or an antenna unit 28, wherein both elements 28 and 36 may also be implemented in a common antenna arrangement. Measurement environment 50 may be implemented to judge and/or evaluate a wireless communication device 38, e.g., network node 30 and/or 40, but not limited hereto. Measurement environment 50 may comprise evaluation means such as a calculation unit, a computer, an anechoic chamber and/or additional means, which are not shown in FIG. 5. Thereby, evaluated in the behaviour of the device 38 may be implemented so as to judge a conformity of the device with regard to a predefined criterion or a plurality of predefined criteria.

When referring again to FIG. 1, the first dataset may relate to an antenna radiation pattern, which is some sort of reference against which the second dataset being obtained from the antenna pattern 32 being generated by device 38 is compared.

The first dataset may, thus, be at least a part of a reference dataset, such that relating the first dataset and the second dataset comprises a comparison between the datasets. This may allow that the relationship includes a comparison result and that evaluating the comparison result includes a judging whether the device is in conformity with the reference dataset or not. This may indicate a kind of pass/fail result, but may also include specific information about what has led to passing/failing the comparison.

According to an embodiment, the reference dataset may relate to a pattern reference such that evaluating the comparison result may include the judging so as to judge whether the device is in conformity with the pattern reference. This may indicate, for example, if the antenna pattern has sufficient coverage, sufficient power/gain along one or more polarizations/directions or the like. Such a method may be executed in at least one measurement environment. That is, it is not necessary that a single measurement environment is used. For example, the values may be obtained in a measurement environment, e.g., the second dataset, but the results are obtained at a different location, for example, when providing the parameters to another expert group doing further elaboration of the data and concluding a multi-objective passing or failing of a performance/performance test. That is, a first dataset may be obtained in a first measurement environment and a second dataset may be obtained in a second measurement environment. The assessment of the first and/or second dataset may be done anywhere.

A result of method 100 performed at a device and/or a measurement environment may provide, for example, for a distribution, e.g., a cumulative distribution function, cf., of two devices or of one device and a unique parameter set/criterion to me met as discussed. Alternatively or in addition, a higher number of devices may be compared.

Alternatively or in addition to performing the method in a measurement environment, the method may be performed in the field, e.g., in a deployment scenario. That is, the first antenna pattern may also be formed by the device, as it is true for the second antenna pattern. The relationship may, thus, indicate a comparison result between the first antenna pattern and the second antenna pattern of the device. Evaluating the behaviour may include a judging whether to select the first antenna pattern or the second antenna pattern or a combination thereof for communicating using the device. For example, when referring again to FIG. 4, the device may relate metrics related to antenna patterns $32_1$ and $32_2$ so as to decide whether to use one of both antenna patterns or, e.g., which of them, or to use both, e.g., as a weighted combination.

Evaluating the behaviour may be performed at the device, at a different node having information about the first antenna pattern $32_1$ and the second antenna patter $32_2$, e.g., a base station or a communicating partner and/or at a network controller being supplied with respective information, e.g., in terms of a measurement report being provided by the device or the communicating partner measuring the antenna pattern. The different device may be or include a network device being part of the network in which the device to be evaluated operates. However, embodiments are not limited hereto but also allow for evaluating the behaviour at a different node that is part of different system, e.g., a part of a test and measurement equipment that is possibly not explicitly used for communication purposes within the network.

According to an embodiment, evaluating the behaviour, i.e., step 140, may be performed at the network controller and may be performed for a plurality of devices so as to orchestrate behaviours of the plurality of devices. That is, a selection on which kind/type or parameters of an antenna pattern to be used may be selected at the network controller based on the metric or a given metric, i.e., an aspect of the network operation to be evaluated. This may allow for a precise orchestration of the wireless communication network.

Method 100 may be executed for a plurality of devices simultaneously operating in a wireless communication network so as to optimize beam forming of the plurality of devices for an overall operation of the network. That is, the method may be executed in a wireless communication network.

According to an embodiment, the evaluating is performed at the network and/or at a test equipment. A result of this step, e.g., an evaluation result may be communicated back to the device as a feedback signal, e.g., as feedback signal 34. The result may alternatively or in addition be provides to other instances, e.g., of the wireless communication network.

When referring again to FIG. 3, some further advantageous embodiments are described in the following. As two or more datasets are to be related by use of the metric but the datasets may relate to same or different parameter structures, e.g., as being obtained by different entities, a structure of datasets may not match.

FIG. 6 shows a schematic block diagram of a method 600 according to an embodiment covering this aspect. When compared to method 100, method 600 of FIG. 6 shows an additional step 125 being arranged prior to relating the first dataset and the second data step in step 130. In step 125, a structure of the first dataset and/or of the second dataset is matched based on the metric, so as to fit to a common data space or data structure prior to relating the first dataset and the second dataset. That is, in step 125, the datasets may be made comparable if this is not yet the case.

Mentioning the structure may relate to an adaption of the first dataset to match the second dataset, to an adaption of the second dataset to match the first dataset and/or an adaptation of the first dataset and/or of the second dataset such that both datasets commonly match a third dataset structure or dataset space.

For example, matching the first dataset and/or the second dataset may comprise one or more of an interpolation of values of the first dataset and/or of the second dataset, e.g., to fill gaps between values of the datasets. Alternatively or in addition, matching the first dataset and/or the second dataset may comprise an extrapolation of values of the first dataset and/or of the second dataset, e.g., to cover the case in which a dataset is, at least in parts, incomplete.

For example, a first dataset may comprise values about a gain or radiated power over a number of sampling points distributed over the surface of an imaginary sphere, or a spherical distribution of sampling points, e.g., a measurement grid. The measurement grid may comprise steps of a first size, e.g., 4 degree. The second dataset may comprise a different grid size of, for example, 6 degree. Thus, the values compared in the set of parameters may relate to the same physical quantity and/or the same associated parameter, but may not be completely comparable without further processing. Thereby, for example, matching 125 may be performed.

For example, only coinciding directions in the grid may be selected, e.g., so as to obtain a reduced dataset in view of an intersection or cut set. Alternatively or in addition, interpolation and/or extrapolation may be performed so as to obtain comparable values.

Matching the first dataset and/or the second dataset may, additionally or as an alternative, comprise:

An adaptation of the parameter value units of the first dataset to match the second dataset;

An adaptation of the parameter value units of the second dataset to match the first dataset; and/or An adaptation of the parameter value units of the first dataset and/or of the second dataset to currently match the parameter value units of a third dataset. For example, units may be converted, e.g., from "V/cm" to "V/m" or "mV/inch" to "V/m" or from "dBm" to "W" or from "dBd" to "dBi", etc.

Embodiments described herein may, thus, allow to compare different antenna patterns of a same device and/or of different devices or states. That is, an antenna radiation pattern may be obtained by measurements, but it is not necessary. For example, a dataset may also be obtained by simulation or calculation or by simple specification and thus independent of both simulation and calculation.

Further, when comparing, for example, two patterns of a same device, a method according to an embodiment may be implemented such that the first antenna pattern is generated by the device under a first condition and the second antenna pattern is generated by the device under a second condition. The condition may be, for example, an operating mode, a battery level, a relative localization and/or orientation in space, different temperatures, pressures, magnetic fields or the like.

Evaluating the behaviour may, thus, include a consideration of a difference between the first condition and the second condition. Furthermore, embodiments described herein are not limited to compare antenna patterns of a same type, e.g., Rx and/or Tx. That is, both the first antenna pattern and the second antenna pattern may be transmission beam patterns. Alternatively, both the first antenna pattern and the second antenna pattern may be reception beam patterns. Alternatively, one of the first antenna beam patterns may be a transmission beam pattern, whilst the other is a reception beam pattern. This may allow for a high degree of information, especially in view of beam correspondence evaluation. Further, the first antenna pattern may be formed by the device, by a different device or is a dataset representing a reference pattern that has been measured or calculated.

That is, methods according to embodiments are implemented, for example, to enhance beam correspondence evaluation.

A method according to an embodiment may comprise obtaining a third dataset representing a third set of values of the at least two parameters relating to a third antenna pattern, such that the metric is used to relate the first dataset, the second dataset and the third dataset to obtain the relationship. As indicated, for example, in FIG. 3, more than two datasets/antenna patterns may be used for the metric.

Embodiments described herein relate to use a metric. However, embodiments are not limited to use a single and/or stated metric. A method in accordance with embodiments is implemented such that the behaviour is evaluated in view of a first criterion using the metric being a first metric and in view of a second criterion using a second metric. Alternatively or in addition, the behaviour may be evaluated in view of a same criterion using the first metric and using the second metric in combination. In combination may relate to form a combined metric and/or to apply different metrics sequentially. For example, the performance of two antenna systems may be compared. At first, this may be done by comparing the difference of their, e.g., maximum EIRP for different electronic scan angles (ESAs). Next, the (e.g., main lobe or sidelobe) pointing direction for different ESAs may be obtained. Then, the difference in the first sidelobe level (FSL) may be differentiated for different ESAs. Then, the cross-polarization ratio of the first and second antenna systems may be compared.

While this provides for an example of the application of different metrics, it has to be noted that the criteria used to select or change the metric may be based on the information to be achieved by evaluating the device. Therefore, according to embodiments, the assessment of two antennas in which a number of metrics is applied, may relate to a sequential implementation of metrics. Therefore, any other ways or methods may be implemented in which the method is executed repeatedly at least in a first repetition and a second repetition for beam patterns of a same or different device. In the first repetition, a first metric may be used and in the second repetition, a different second metric may be used.

The present invention is explained in other words in the following. The explanation given contains:

Examples of dataset (also referred to as dataset) comparisons
The antenna pattern as a dataset
Data organization
One-by-one and two-by-two comparisons
1. The Antenna Pattern as a Dataset A dataset can be defined as an ordered numeric set of n observations of d parameters. An antenna radiation pattern thus represents an example of such a dataset since it comprises a collection of (n) spatially-sampled data points of a plurality of (d) parameters. For example, when measured over angular pairs defined by the theta and phi coordinates (or through the use of any other suitable coordinate system), an antenna pattern can be described by its $E_\theta$, $E_\varphi$, $E_r$ and $E_{total}$ components. These components can in turn can be dependent on a particular frequency of operation. Furthermore, for an arrangement in which the antenna pattern can be dynamically adjusted so that more energy is directed in one direction with respect to another—for example in the case of an electronically scanned array (ESA)—the antenna radiation pattern is also a function of the direction of the main beam. In other words, the shape of the pattern changes as the beam is directed, not just in relation to the direction and beamwidth of the main lobe but also in relation to its strength. Moreover, the position and strength of sidelobes and the position and depth of nulls are also affected. In addition, the amount of energy associated with a particular polarization or the ratio of energy associated with orthogonal polarizations, may change. Beyond this, and due to the electronic circuits or other means used to form an electronically steered array, the pattern produced by the ESA may also be a function of the strength of the transmitted signal, its bandwidth, the temperature of the surroundings, the temperature of the equipment and/or other environmental factors. In view of the factors presented above, it should be clear to one with reasonable skill in the art that an antenna radiation pattern is a dataset.

Known metrics do not describe the relationship between a receive beam and a transmit beam, but the relationship between an autonomously selected Tx beam and another one determined by beam sweeping. Those concepts ignore the pattern properties of the Rx beam. Embodiments thus relate to cover such missing information. For example, beam correspondence/pairing combinations may be considered that relate to different key performance indicators, KPIs, for example:

A UE to maximize Rx power at the first eNodeB (target) while minimizing Rx power at the second eNodeB (victim) e.g., a different node A UE to choose Rx beams with best SINR considering aggressive signals, i.e., signals from interfering node, and to respond with a Tx beam maximizing Rx power at eNodeB (target).

For example, the UE may form a main beam in the appropriate direction such that the signal received by its communication partner may meet a criterion. At the same time however, a second network entity may report, e.g., as a victim, that it receives a possibly unacceptable level of interference. The UE is informed of this, e.g., with an interference report. However, as the UE does not exactly know how or why it is causing interference, it looks to its known metrics and identifies that due to its present configuration, it is producing a pattern with an X dB first sidelobe level (FSL). The UE may combine the information of the interference report with the knowledge of the metrics and may change its pattern to one in which the FSL is lower while providing that the needed link performance is maintained with the communication partner. In case of success, with the revised pattern, a lower number or even no further interference reports are received.

2. Link Performance Measures and Metrics as a Dataset

Following on from the foregoing discussion, link performance metrics may also be considered to represent a dataset. This is of particular relevance in a deployment scenario since a parameter such as EIRP might have different connotations when applied to line-of-sight (LOS) or non-LOS propagation environment. Link performance parameters include but are not limited to the following: SNR, SINR, RSSI, etc. to be measure in the uplink and/or downlink; disentanglement between signal at target and victim gNBs; and a metric suitable for multi-objective optimization.

As an example, consider the uplink beam configuration from a UE to a base station (BS), while the selected uplink (UL) beam should avoid interference towards another base station, e.g. case of multiple IAB backhaul links within vicinity.

While a UE is creating a set of beams towards its target/serving BS, other BSs around may measure the interference based on a reference signal (RS) e.g. SRS provided by the UE in UL and report the received amplitude and phase to the UE. Such feedback which can be considered similar to type II CSI feedback defined for downlink can be provided either directly in a multi-connectivity scenario or via the serving BS or over the top (for example, through another form of connection). By providing such feedback and, calculating or providing additionally further KPIs, e.g. the resulting link performance degradation in terms of SINR or throughput, allows the effect of UE interference on the victim BS link performance to be assessed. A suitable margin for stable and independent operation of links used by the victim BS can be derived and reported to the UE and/or its serving BS. Provided such information according to a meaningful metric the transmit beam of the UE can be refined and a reliable link towards its serving BS can be established and maintained while the imposed interference towards another BS is reduced below a specific threshold which would cause intolerable performance degradation of link used by the other BS.

3. Organization within a Dataset

When two or more datasets contain a similar organization or arrangement of data—for example and with reference to antenna pattern data, similar spatial sampling, grid size or density—pairs of data can be compared between the datasets. On the other hand, when the datasets use disparate spatial sampling, interpolation can be used to ensure that a common sampling scheme can be applied to all datasets.

Cluster analysis is a general methodology for exploration of datasets when no or little prior information is available on the data's inherent structure. It is used to group data into classes (groups or clusters) that share similar characteristics, and is widely used in behavioural and natural scientific research for classifying phenomena or objects under study without predefined class-definitions. A broad collection of clustering methods has been proposed in areas such as statistics, data mining, machine learning, bioinformatics, and many textbooks and overview papers illustrate the variety of methods as well as the vigorous interest in this field over the last decade with the growing availability of computer power for analysing extensive datasets or data objects involving many attributes (i.e. finding clusters in high-dimensional space, where the data points can be sparse and highly skewed).

Sparse representation (reduction), e.g., whenever the lobe is above or below a limit, collect the level and direction.

4. Descriptive Statistics

Sample data may be summarized graphically or with summary statistics. Sample statistics include the mean, variance, standard deviation, and median. For the following definitions let $x_1, x_2, \ldots, x_n$ represent the values obtaining from a random sample of size n drawn from a population of interest.

4.1 Sample Mean

The sample mean, $\bar{x}$, is the average of the n values observed:

$$\bar{x} = \frac{1}{n}\sum_{i=1}^{n} x_i = \frac{x_1 + x_2 + \ldots + x_n}{n} \qquad (1)$$

4.2 Sample Variance

The sample variance equals the mean squared deviation from $\bar{x}$. A small $s^2$ (a small variance) means that the observed values cluster around the average, while a large variance ($s^2$) means that they are more spread out. Thus, the variance is a measure of the "spread" in the sampled values.

$$s^2 = \frac{1}{n-1}\sum_{i=1}^{n} (x_i - \bar{x})^2 \qquad (2)$$

4.3 Sample Standard Deviation

The sample standard deviation, s, is often a more useful measure of spread than the sample variance, $s^2$, because s has the same units (watts, V/m, etc.) as the sampled values and $\bar{x}$.

$$s = \sqrt{\frac{1}{n-1}\sum_{i=1}^{n} (x_i - \bar{x})^2} \qquad (3)$$

4.4 Distribution of the Sample Mean

When a sample is taken at random, the values of any random variable associated with it are also determined by chance and therefore statistics, such as the sample mean that are calculated from these values, are themselves random variables too. The random variable $\bar{X}$, as defined in eqn. (4):

$$\bar{X} = \frac{X_1 + X_2 + \ldots + X_n}{n} \qquad (4)$$

has a probability distribution of its own. If we intend to use the sample mean $\bar{x}$, as defined in eqn. (5):

$$\bar{x} = \frac{x_1 + x_2 + \ldots + x_n}{n} \qquad (5)$$

to estimate the mean $\mu$ of the population from which the sample was drawn, then we need to know which values the random variable $\mu$ can assume and with what probability. In other words, we need to know the probability distribution of $\bar{X}$. It can be shown that $\bar{X}$ has the following properties:

The mean of $\bar{X}$ equals the mean of X, i.e., $\mu_{\bar{x}}=\mu$ which says that the sample mean $\bar{x}$ is an unbiased estimator of the population mean $\mu$.

The variance of $\bar{X}$ is less than that of X. In fact, $$\sigma_{\bar{X}}^2 = \frac{\sigma^2}{n}.$$

This states that there is less variability in averaged values (and the variability decreases as the size of the sample increases) than there is in individual values.

If the variable X is normally distributed, then $\bar{X}$ will also be normal.

The properties above, however, do not describe the shape of the distribution of $\bar{X}$ (which is needed for making inferences about $\mu$ except in the special case where X is normal. They only contribute information about the mean and spread of the distribution. In general, the shape of the distribution of $\overline{X}$ may be difficult to determine for non-normal populations and small samples. However, for large samples the Central Limit Theorem states that $\overline{X}$ will be at least approximately normal.

5. Hypothesis Testing

In hypothesis testing we are asked to evaluate a claim about something, such as a claim about a population mean. Hypothesis testing provides a systematic framework, grounded in probability, for evaluating such claims. However, although hypothesis testing uses probability distributions to arrive at a reasonable (and defensible) decision either to reject or "fail to reject" the claim associated with the null hypothesis of the test, $H_0$, it does not guarantee that the decision is correct. The table below outlines the possible outcomes of a hypothesis test, i.e. is an evaluation of the null hypothesis and its implications.

|  | Decision | |
| --- | --- | --- |
| Truth | Accept $H_0$ | Reject $H_0$ |
| $H_0$ TRUE | Correct decision | Type I error |
| $H_0$ FALSE | Type II error | Correct decision |

Assuming that the truth of the null hypothesis is known it is possible to categorize the decisions that can be made based on either accepting or rejecting the null hypothesis. In addition to the category of correct decision, two error types are possible. A type I error is defined as incorrectly rejecting $H_0$ when, in fact, it is true. In a hypothesis test conducted at the significance level $\alpha$, the probability of making a type I error, if $H_0$ is true, is at most $\alpha$. A type II error is defined as incorrectly failing to reject $H_0$ when, in fact, it is false. For a fixed sample size n, you cannot simultaneously reduce the probability of making a type I error and the probability of making a type II error. However, if it is possible to take a larger sample, it is possible to reduce both probabilities.

5.1 Analysis of Variance

The analysis of variance (ANOVA) is a form of statistical hypothesis testing used in the analysis of experimental data. The ANOVA is based on the law of total variance and can be used for hypothesis testing. The variance observed in association with a particular variable is separated into the components attributable to the sources of variation. In simplicity, ANOVA provides a statistical test of whether two or more population means are equal, and therefore generalizes the t-test beyond two means.

Principal Components Analysis

Principal components analysis (PCA) may relate to determining or finding the principal directions in the data, and use them to reduce the number of dimensions of the set by representing the data in linear combinations of the principal components.

Embodiments may have a high performance or even work best for multivariate data. PCA may find the m<d eigen-vectors of the covariance matrix with the largest eigen-values. These eigen-vectors are the principal components. Decomposition of the data in these principal components can be used to obtain a more concise dataset. When applying PCA caution should be taken regarding the following notes: depends on the normalization of the data (i.e., is ideal for data with equal units); works only with linear relations between the parameters; and valuable information can sometimes be lost in PCA.

Factor Analysis

In factor analysis (FA) data can be represented with fewer variables. However, FA is not invariant for transformations and can result in multiple equivalent solutions.

Multidimensional Scaling

Multidimensional scaling is in certain respects, equivalent to PCA, but can also be applied where there are non-linear relations between the parameters. For example, inputs can take the form of a single dimension (1D) similarity-map (or distance-map) between data points wherefrom the output is at least a two dimensional (2D) map of the data points.

6. Similarity Measures

The similarity between two sets of data or datasets is a numerical measure of the degree to which the two datasets are alike. Consequently, similarities are higher for dataset pairs that are more alike and, conversely, lower for those that are less alike. Datasets can however be compared using different similarity measures, each perhaps yielding different results. Choosing the appropriate similarity measure is of fundamental importance to many applications, including the comparison of antenna radiation patterns. This choice is also dependent on the way in which the datasets are constructed and therefore describe or represent the objects or datasets to be compared. Furthermore, different methods of representation could be used for the different objects that are to be compared.

The table being illustrated in FIG. 7 presents an overview of some of the common statistical methods that can be used to compare sets of data. The table shows the goal of the comparison and the test that could be applied to compare the data according to their type. For example, one comparing one group of data with a hypothetical or target value—for example a technical requirements specification—the one-sample t-test can be used for parametric data. A second example, in which two sets of parametric data are compared, can be made using the paired t-test. A further and third example, in which three or more sets of parametric data are compared, can be made using the one-way analysis of variance (ANOVA) test. FIG. 7 is thus an overview of statistical methods used for the comparison of datasets.

6.1 Similarity, Dissimilarity and Distance

Generally speaking, we define the function sim(p, q) to be a measure of the similarity of samples p and q. The similarity function has the following properties:

$$0 \geq \mathrm{sim}(p,q) \geq 1 \tag{6}$$

$$\mathrm{sim}(p,q) = \mathrm{sim}(q,p) \tag{7}$$

$$\mathrm{sim}(p,q) = 1 \tag{8}$$

We further define the function dissim(p, q) to be a measure of the dissimilarity of samples p and q. The dissimilarity function has the following properties:

$$0 \geq \mathrm{dissim}(p,q) \geq 1$$

$$\mathrm{dissim}(p,q) = 1 - \mathrm{sim}(p,q) \tag{9}$$

Without loss of generality, we now define the function dist(p, q) to be a measure of the distance between samples p and q. The distance function has the following properties:

$$\mathrm{dist}(p,q) \geq 0 \tag{10}$$

$$\text{if } \mathrm{dist}(p,q) = 0 \text{ then } p = q \tag{11}$$

A further property of the distance function is the triangle inequality in which the samples p and q are compared with relation to a third arbitrary point a.

$$\mathrm{dist}(p,q) \leq \mathrm{dist}(p,a) + \mathrm{dist}(a,q) \tag{12}$$

It should be noted that a) the distance function relates to the dissimilarity function and b) that a vector space with a distance definition is a metric space.

6.2 Examples of Distance Measures

Generally, we measure the distance between two points (which can be expressed by using either vectors or matrices) with a straight line that joins them. The length of the straight line represents the shortest distance between these two points and is called the Euclidean distance—see eqn. (13).

$$\text{dist}_E(p,q)^2 = (p_1 - q_1)^2 + (p_2 - q_2)^2 + \ldots + (p_N - q_N)^2 \qquad (13)$$

The Manhattan distance (or taxi-cab metric) between two vectors is equal to the one-norm of the distance between the vectors. In this case, the distance between the points is not the length of a straight line that joins them, but instead the total length of the lines aligned with each axis—see eqn. (14).

$$\text{dist}_M(p,q)^2 = |p_1 - q_1| + |p_2 - q_2| + \ldots + |p_N - q_N| \qquad (14)$$

Whereas the Manhattan distance considers the sum of the lengths along each axis, the maximum-norm or max-norm distance considers the greatest length only—see eqn. (15).

$$\text{dist}_{MAX}(p,q)^2 = \max\{|p_1 - q_1| + |p_2 - q_2| + \ldots + |p_N - q_N|\} \qquad (15)$$

Three distance measure examples have been presented above: the Euclidean distance; the Manhattan distance; and the max-norm distance. Further examples, not presented here, are not limited to include: the absolute difference; the Damerau-Levenshtein distance; the edit distance; the graph edit distance; the Hamming distance; the Jaro-Winkler distance; the Kendall tau distance; the Lee distance; the Levenshtein distance; the Mahalanobis distance; and the mean absolute difference.

7. Correlation

The Pearson Product Moment Correlation Coefficient—r—measures the strength of the linear relationship between the paired x and y values in a sample.

$$r = \frac{\sum (x - \bar{X})(y - \bar{Y})}{\sqrt{[\sum (x - \bar{X})^2][\sum (y - \bar{Y})^2]}} \qquad (16)$$

$$r = \frac{\sum XY - (N\bar{X}\bar{Y})}{\sqrt{(\sum X^2 - N\bar{X}^2)(\sum Y^2 - N\bar{Y}^2)}} \qquad (17)$$

$$-1 \leq r \leq 1 \qquad (18)$$

Also the correlation between the p-dimensional observations of the $i^{th}$ and $j^{th}$ objects can be used to quantify dissimilarities between them, as in:

$$dissim(i, j) = \frac{(1 - \rho_{ij})}{2} \qquad (19)$$

$$\text{where } \rho_{ij} = \frac{\sum_{k=1}^{p}(x_{ik} - m_i)(x_{jk} - m_j)}{\sqrt{\sum_k (x_{ik} - m_i)^2} \sqrt{\sum_k (x_{jk} - m_j)^2}} \qquad (20)$$

with $m_i$ and $m_j$ the corresponding averages over the p attribute-values. This measure is however considered contentious as a measure for dissimilarity since it does not account for relative differences in size between observations (e.g. $x_1 = (1,2,3)$ and $x_2 = (3,6,9)$ have correlation 1, although $x_1$ is three times $x_2$).

7.1 The PDF, the CDF and the CCDF

Probability distribution functions, PDF, cumulative distribution functions, CDF, and/or complementary distribution functions, CCDF, may be used for at least a part of the metric. For example, a CDF may be obtained as a result of a statistical processing in which, for example, many points of data measured at different locations, times and/or frequencies may be reduced so as to provide an overall description of the nature of those many points. From this reduction, various results may be obtained—for example what is the probability of a data point having a value equal or greater than some level or threshold or what is the probability of a data point having a value less than some level of threshold.

Beam Pairing Mechanisms

In the following, examples are given to illustrate the concept of beam pairing, for which the embodiments described herein may be of advantage.

Figure 8B:
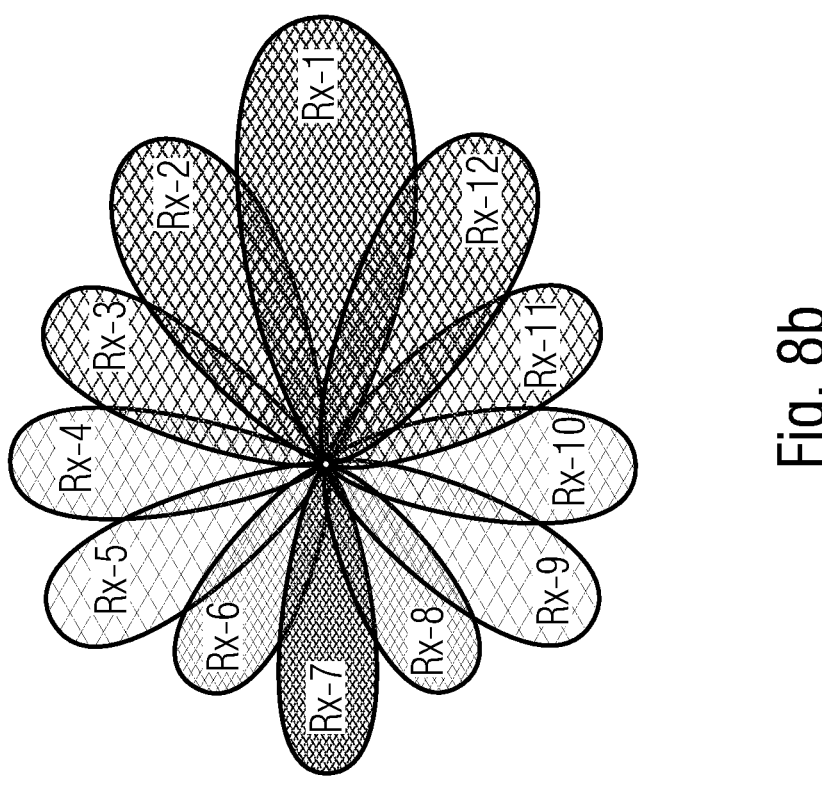
FIGS. 8a-8b present an example of the simplified beam patterns produced by a multibeam antenna arrangement created by a communication device, according to an embodiment.
Figure 8A:
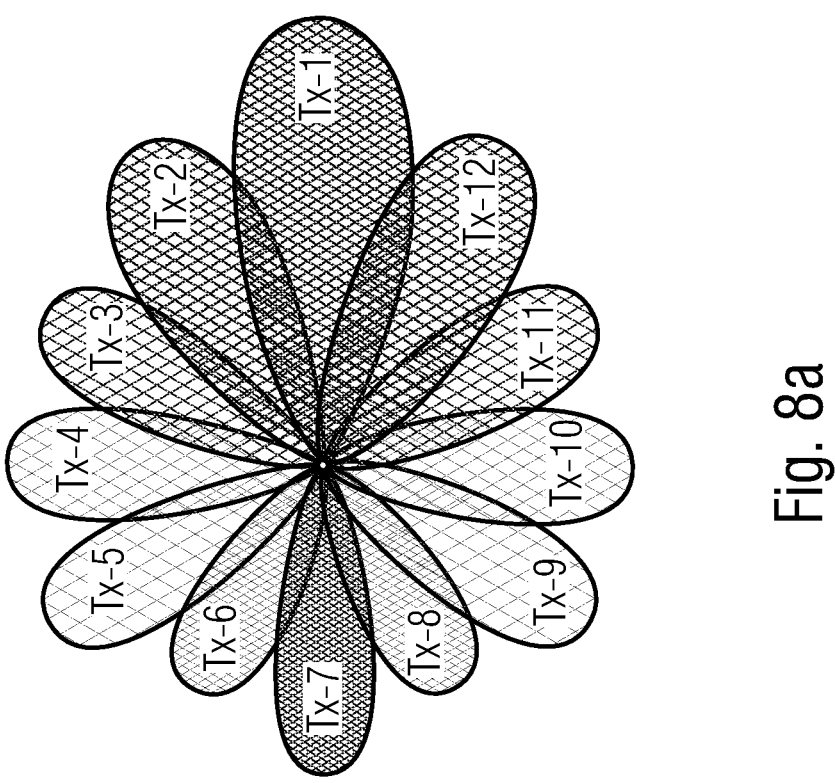

FIG. 8 presents an example of the simplified beam patterns produced by a multibeam antenna arrangement created by a communication device. For simplicity, the transmission and reception beam patterns, shown in FIGS. 8a and 8b respectively, are illustrated to be identical whereas in a practical system differences between the two sets of patterns will exist to some greater or lesser extent. FIGS. 8a and 8b introduce the concept that beam pairing can be applied to a single device whereby the following set of twelve beam pairs can be identified: Tx-1/Rx-1; Tx-2/Rx-2; Tx-3/Rx-3; Tx-4/Rx-4; Tx-5/Rx-5; Tx-6/Rx-6; Tx-7/Rx-7; Tx-8/Rx-8; Tx-9/Rx-9; Tx-10/Rx-10; Tx-11/Rx-11; and Tx-12/Rx-12. That is, FIG. 8 a and FIG. 8b show an example of the transmission (FIG. 8a) and reception (FIG. 8b) beam patterns of the same device comprising twelve discernible beams wherein each beam is the main lobe of a particular antenna radiation pattern. For convenience, the sidelobes of all patterns have been omitted.

Figure 9:
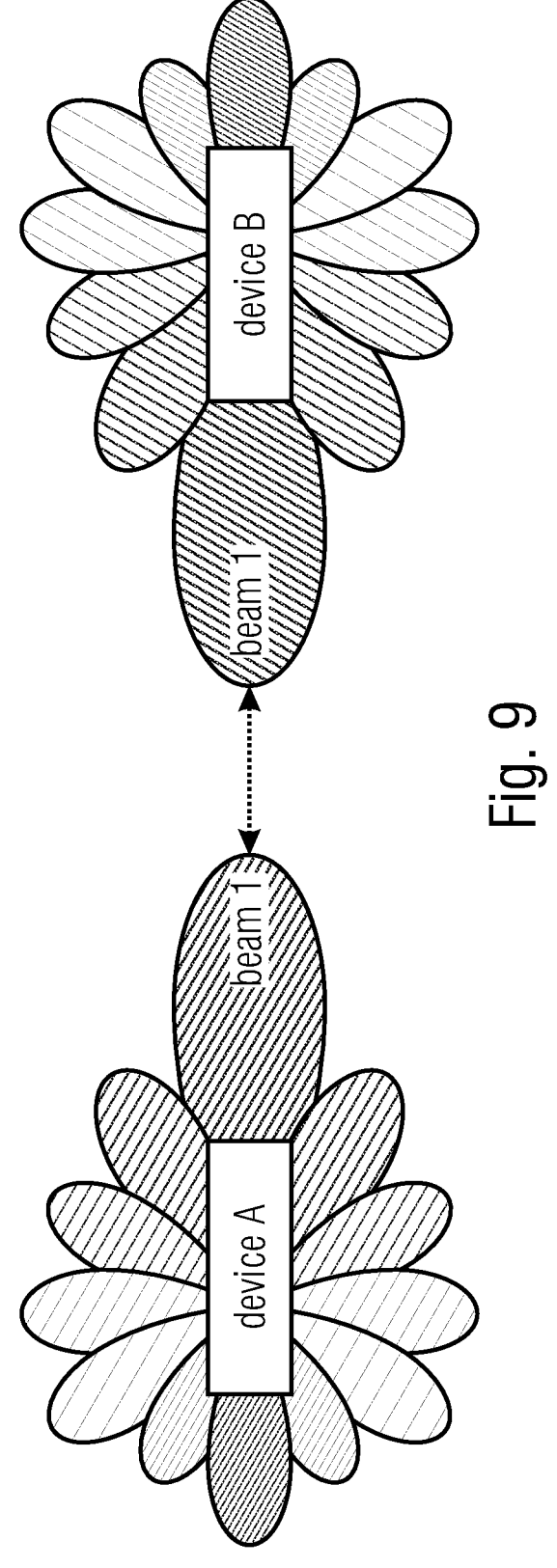
FIGS. 9-16 present examples of beam pair combinations between two devices according to embodiments.
Figure 10:
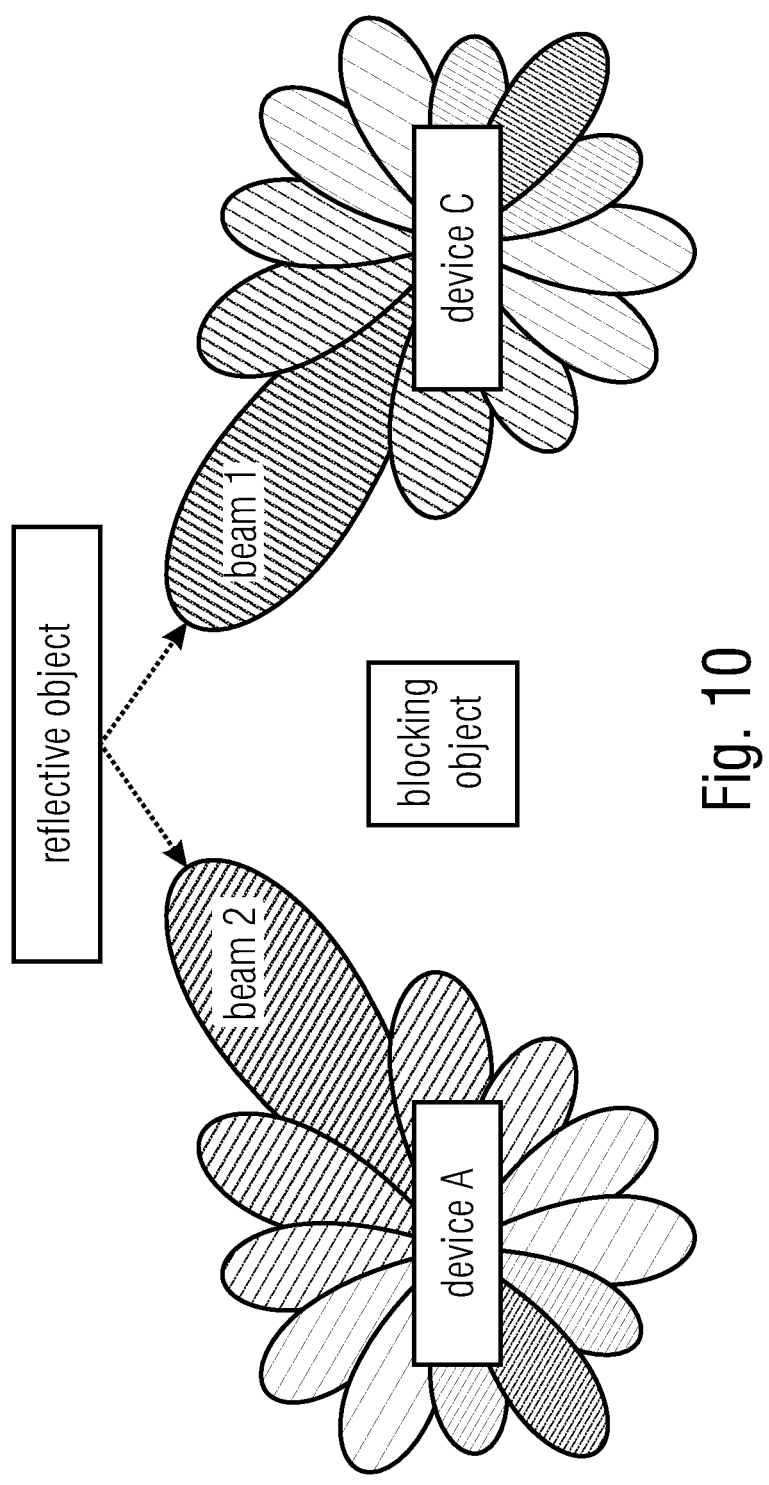

FIGS. 9-16 present examples of beam pair combinations between two devices. In FIGS. 9 and 10, single beam pair examples are illustrated.

Figure 13:
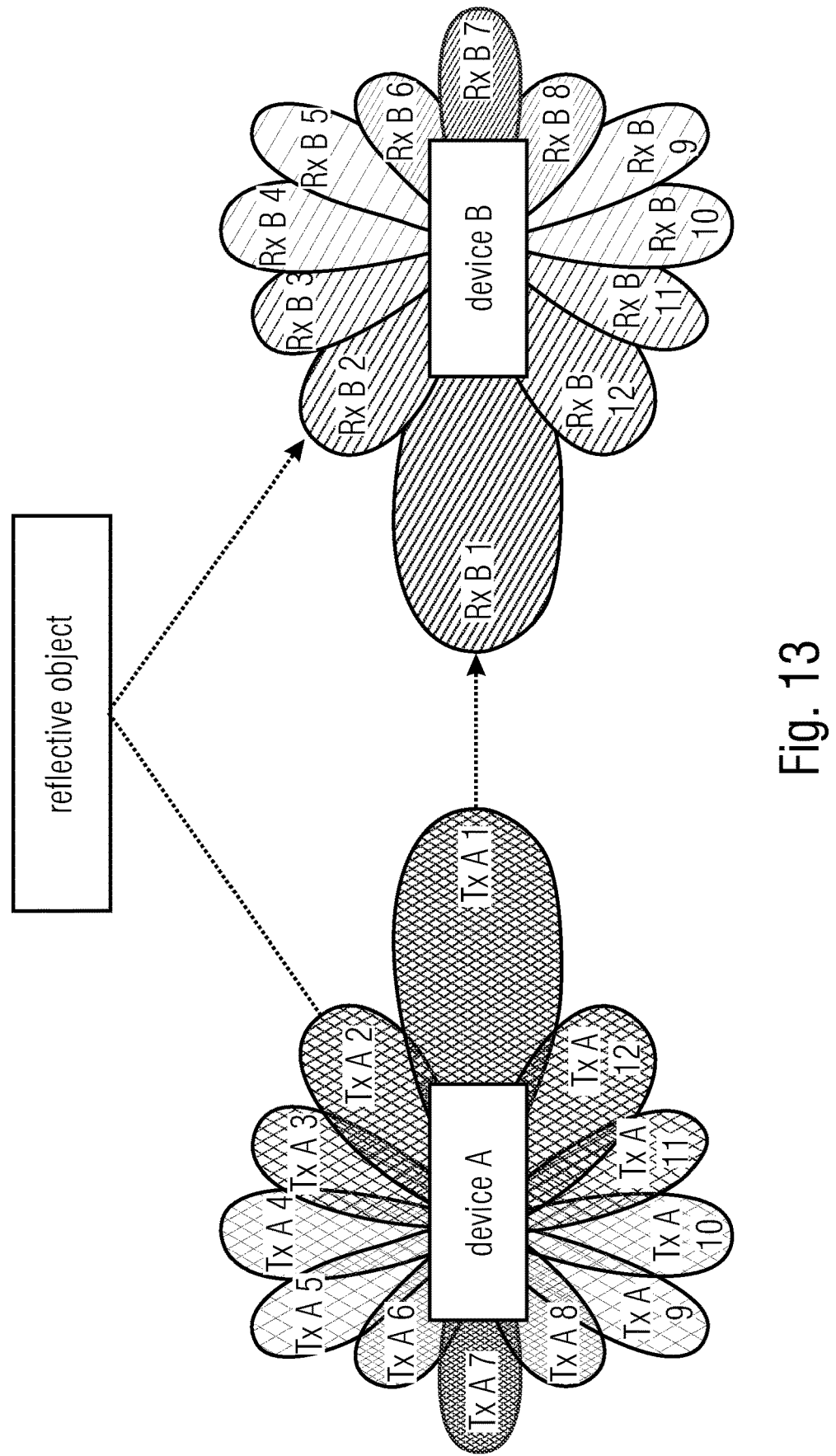
Figure 14:
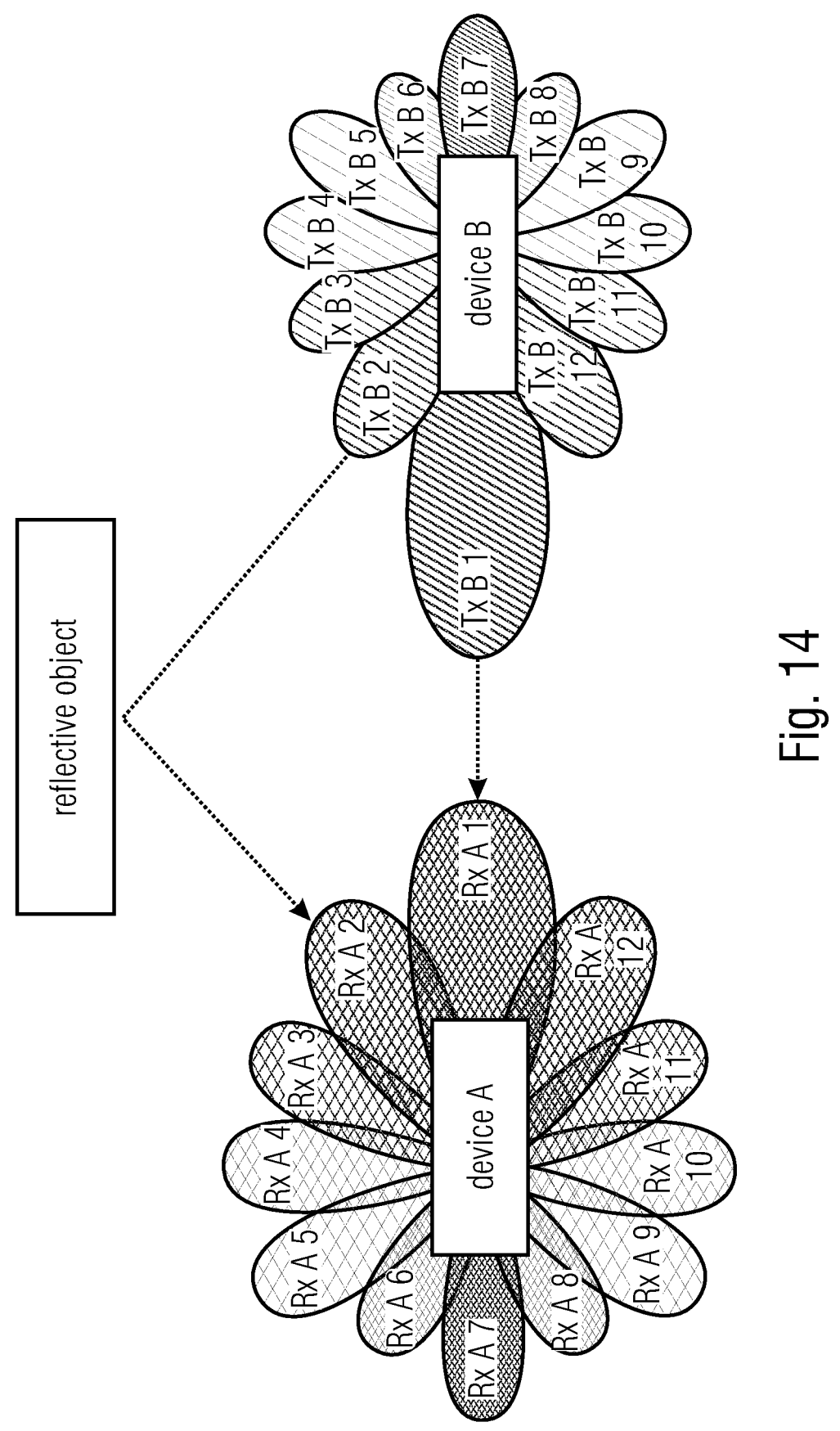
Figure 15:
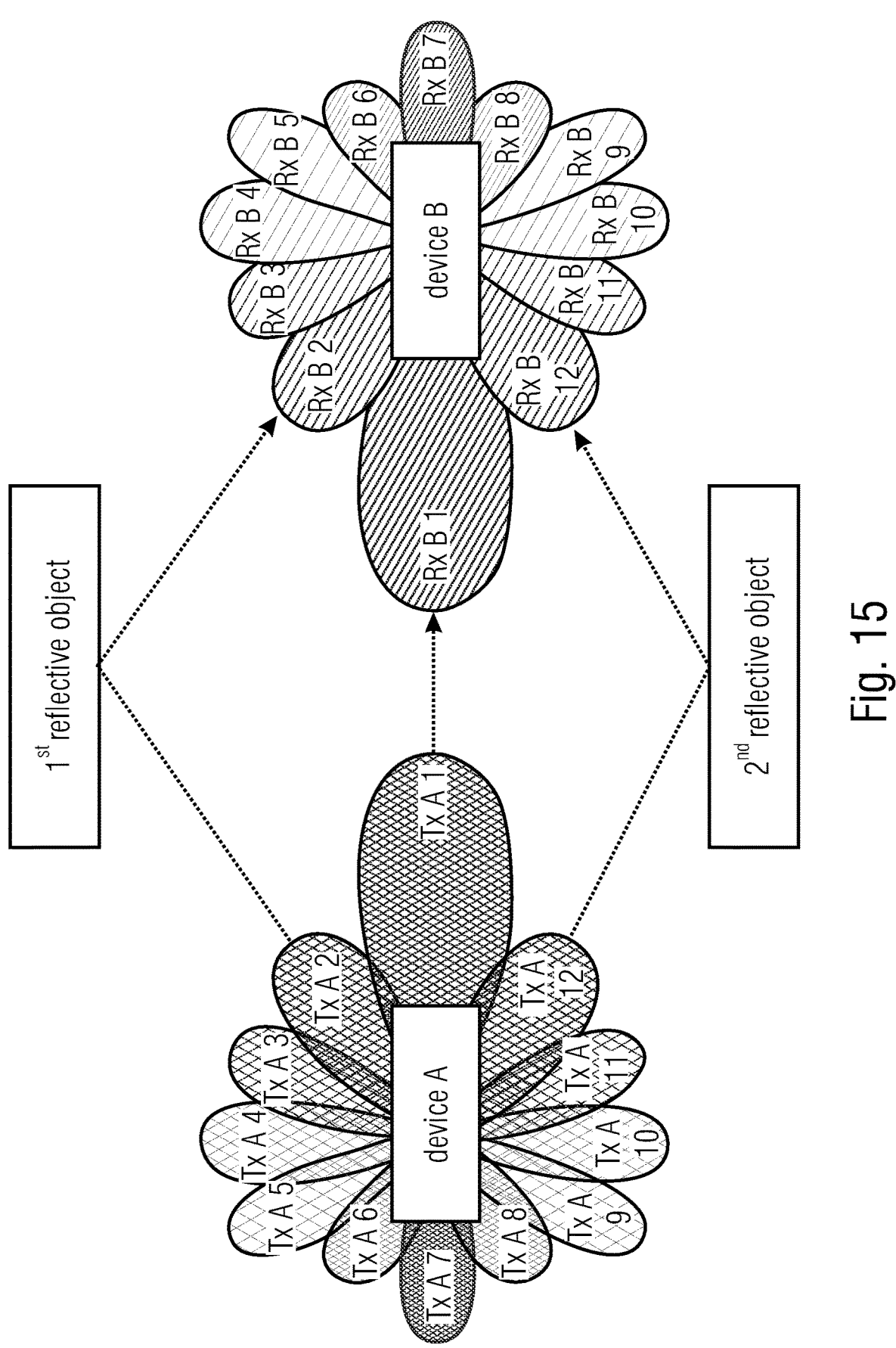
Figure 16:
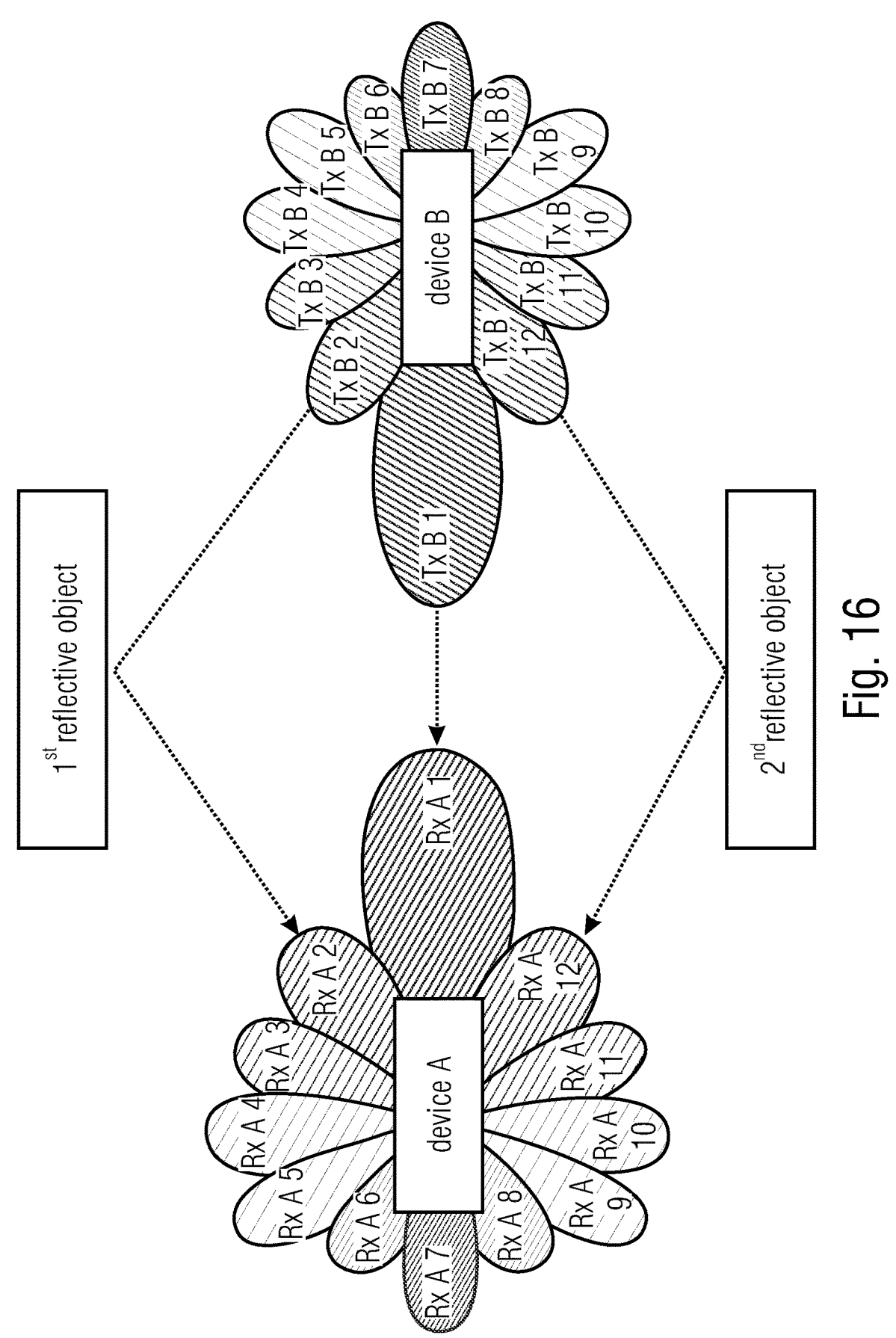

In FIGS. 11 to 14, examples of double beam pairs are drawn while in FIGS. 15 and 16, triple beam pair examples are shown. The concept of multiple beam pairing between devices and its logical extension, the notion of an arbitrary number of beam pairs being created between multiple devices, should be apparent to one skilled in the art.

In FIGS. 9 to 12, the beams of each can be used for either the purposes of transmission or reception so as to facilitate a wireless connection between the two devices in either direction.

FIG. 9 shows an example of beam pairing between two devices in which Beam 1 of Device A forms a line-of-sight alignment with Beam 1 of Device B. The beams of both devices can be used for either transmission or reception purposes.

FIG. 10 shows an example of beam pairing between devices A and C. Due to the presence of a blocking object, Beam 1 of Device A and Beam 1 of Device C form a non-line-of-sight pair.

Figure 11:
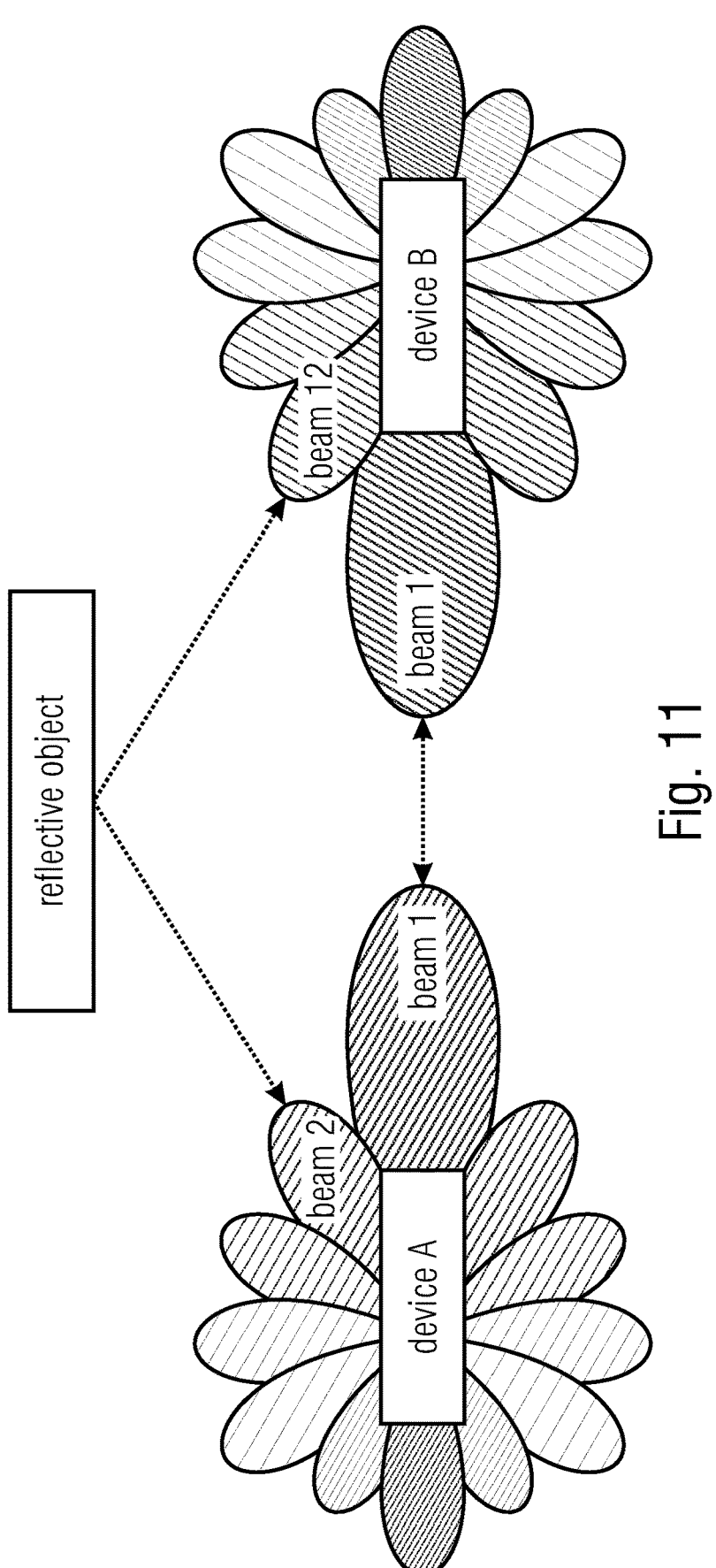

FIG. 11 shows an example of two beam pairs between devices A and B. Beam 1 of Device A forms a line-of-sight pairing with Beam 1 of Device B and, due to a reflection, Beam 2 of Device A and Beam 12 of Device B form a non-line-of-sight pairing.

Figure 12:
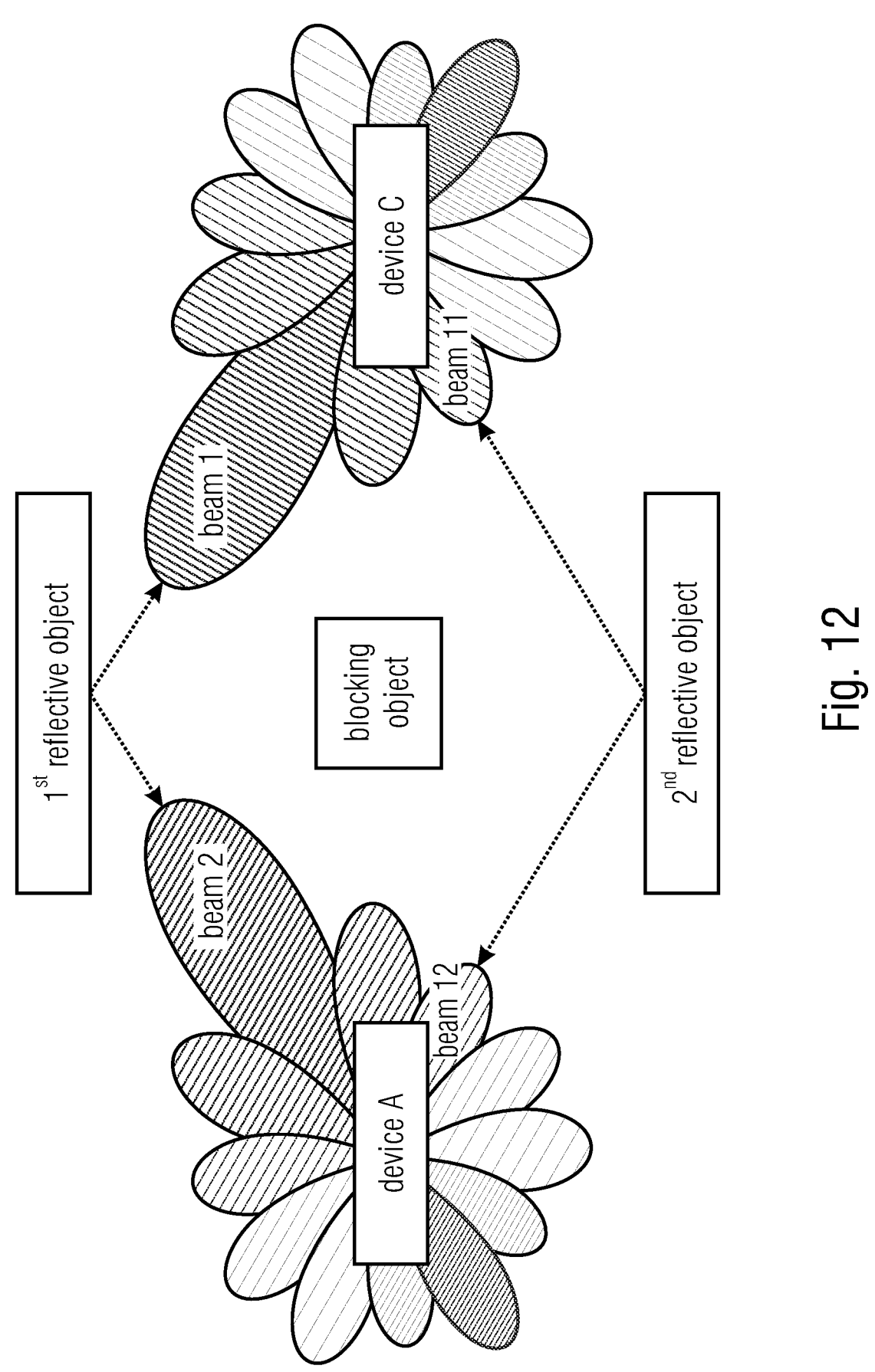

FIG. 12 shows an example of two beam pairs between devices A and C. Due to the presence of a combination of blocking and reflective objects, Beam 2 of Device A and Beam 1 of Device C form a non-line-of-sight pairing. Similarly, Beam 12 of Device A and Beam 11 of Device C also form a non-line-of-sight pairing.

FIG. 13 shows an example of two Tx-Rx beam pairs between devices A and B. Beam Tx A 1 of Device A forms a line-of-sight pairing with Beam Rx B 1 of Device B and, due to a reflection, Beam Tx A 2 of Device A and Beam Rx B 2 of Device B form a non-line-of-sight pairing.

FIG. 14 shows an example of two Tx-Rx beam pairs between devices B and A. Beam Tx B 1 of Device B forms a line-of-sight pairing with Beam Rx A 1 of Device A and, due to a reflection, Beam Tx B 2 of Device B and Beam Rx A 2 of Device A form a non-line-of-sight pairing.

FIG. 15 shows an example of three Tx-Rx beam pairs between devices A and B. Beam Tx A 1 of Device A forms a line-of-sight pairing with Beam Rx B 1 of Device B. Due to reflections, Beam Tx A 2 of Device A and Beam Rx B 2 of Device B and, similarly, Beam Tx A 12 of Device A and Beam Rx B 12 of Device B, form non-line-of-sight pairings.

FIG. 16 shows an example of three Tx-Rx beam pairs between devices B and A. Beam Tx B 1 of Device B forms a line-of-sight pairing with Beam Rx A 1 of Device A. Due to reflections, Beam Tx B 2 of Device B and Beam Rx A 2 of Device A and, similarly, Beam Tx B 12 of Device B and Beam Rx A 12 of Device, form non-line-of-sight pairings.

FIGS. 8 to 16 are summarized in tabular form shown in FIG. 17 being a summary of the permutations visualized in FIGS. 8 to 16.

In the following, examples of a beam correspondence matrix are given.

FIGS. 18 to 22 show different scenarios in which an example device-under-test, DUT, 42 is stimulated by a link antenna 36, e.g., any antenna, antenna panel or TRP of a communicating node or a measurement environment, the link antenna 36 providing for a respective signal or beam 44 to which the DUT 42 responds.

The behaviour being explained is described for further describing embodiments of the present invention by showing that a device such as the DUT 42 which may be a network node of embodiments described herein, may show a complex behaviour when being operated, the complex behaviour being evaluable with the embodied concepts.

Figure 18:
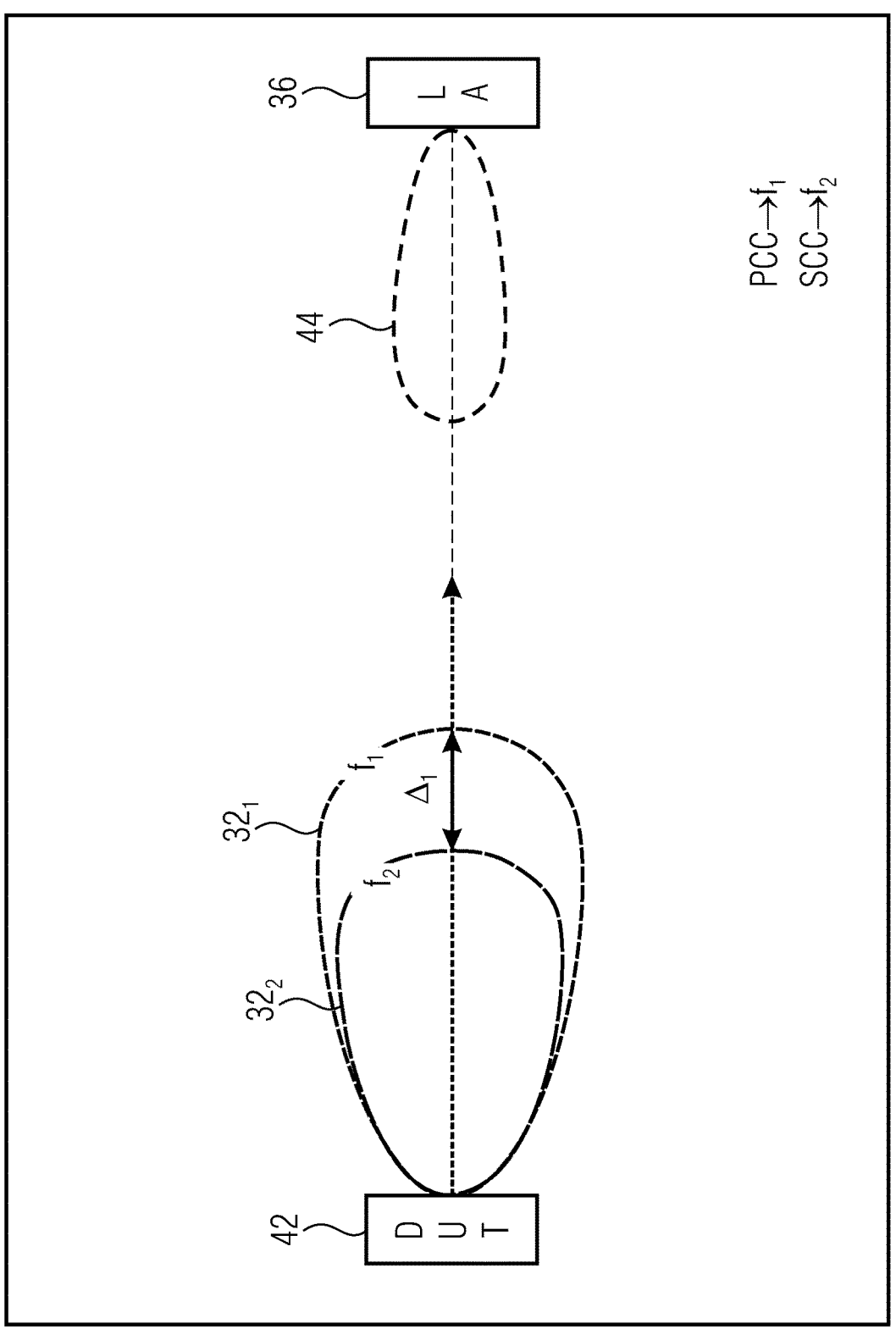
FIGS. 18-22 show different scenarios in which an example device-under-test, DUT, stimulated by a link antenna to describe embodiments of the present invention.

FIG. 18 shows a schematic block diagram of a scenario in which a device such as a network node according to an embodiment described herein communicates with a link antenna such as link antenna 36 which may be, according to other examples, an antenna or TRP of any other node in a measurement environment or wireless communication network. A device-under-test (DUT) 42, e.g., a network node in accordance with embodiments, is arranged so that its boresight points directly at a link antenna (LA). The DUT 42 forms two antenna patterns, shown here in simplified form as main lobes or beams only. A first beam $32_1$ carries the primary component (PCC) using a first component carrier (CC1) operating at a frequency assignment of $f_1$ while a second beam $32_2$ carriers the secondary component carrier (SCC) using a second component carrier (CC2) operating at a frequency assignment of $f_2$. A shared or common beamformer is used to form the two antenna patterns comprising the PCC and SCC beams. As the beamformer is arranged to direct these beams in a boresight direction, no incremental phase difference or phase gradient is applied to the antenna elements that form the antenna array. Therefore, even though the beams operate at different frequencies, the main lobes point in the same direction. However, as the strength of these beams may be unequal, the link antenna of the measurement equipment is used to measure PCC and SCC EIRP and record their difference as $\Delta_1$.

Figure 19:
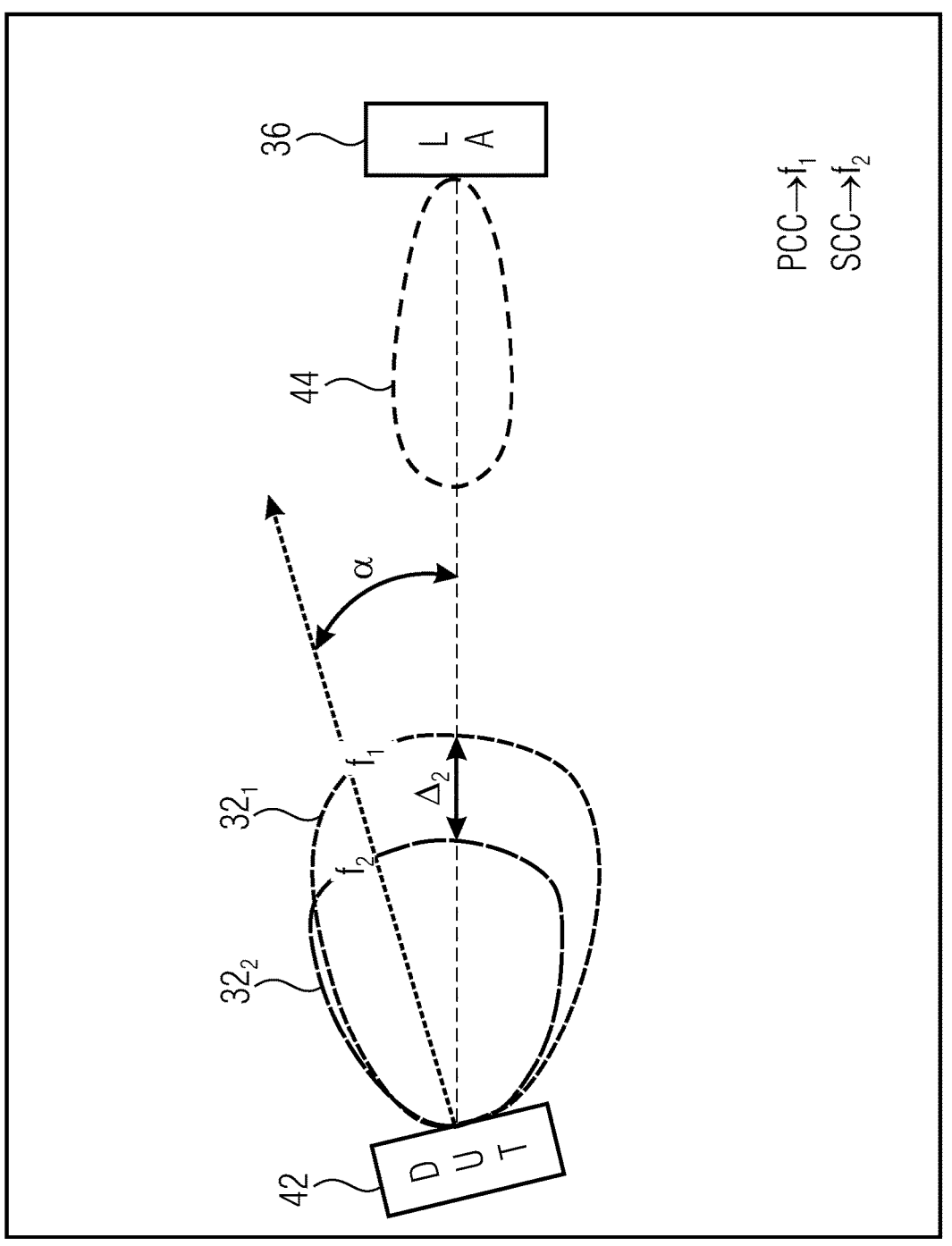

FIG. 19: A device-under-test (DUT) 42 is arranged so that its boresight points away from a link antenna (LA) by an angle of a degrees with respect to the LA—in this example the angle is 15°. The DUT 42 forms two antenna patterns, shown here in simplified form as main lobes or beams only. A first beam $32_1$ carries the primary component (PCC) using a first component carrier (CC1) operating at a frequency assignment of $f_1$ while a second beam $32_2$ carriers the secondary component carrier (SCC) using a second component carrier (CC2) operating at a frequency assignment of $f_2$. A shared or common beamformer is used to form the two antenna patterns comprising the PCC and SCC beams. The beamformer is arranged to direct these beams away from boresight by applying an incremental phase difference or phase gradient to the antenna elements that form the antenna array based on the operating frequency of the PCC, $f_1$. Therefore, and because the beams operate at different frequencies, the SCC beam will be misaligned or squinted with respect to the PCC beam. In addition to the effects of squinting, the strength of these beams may also be unequal. The link antenna of the measurement equipment is thus used to measure the EIRP of the PCC and SCC beams and to record their difference as $\Delta_2$.

Figure 20:
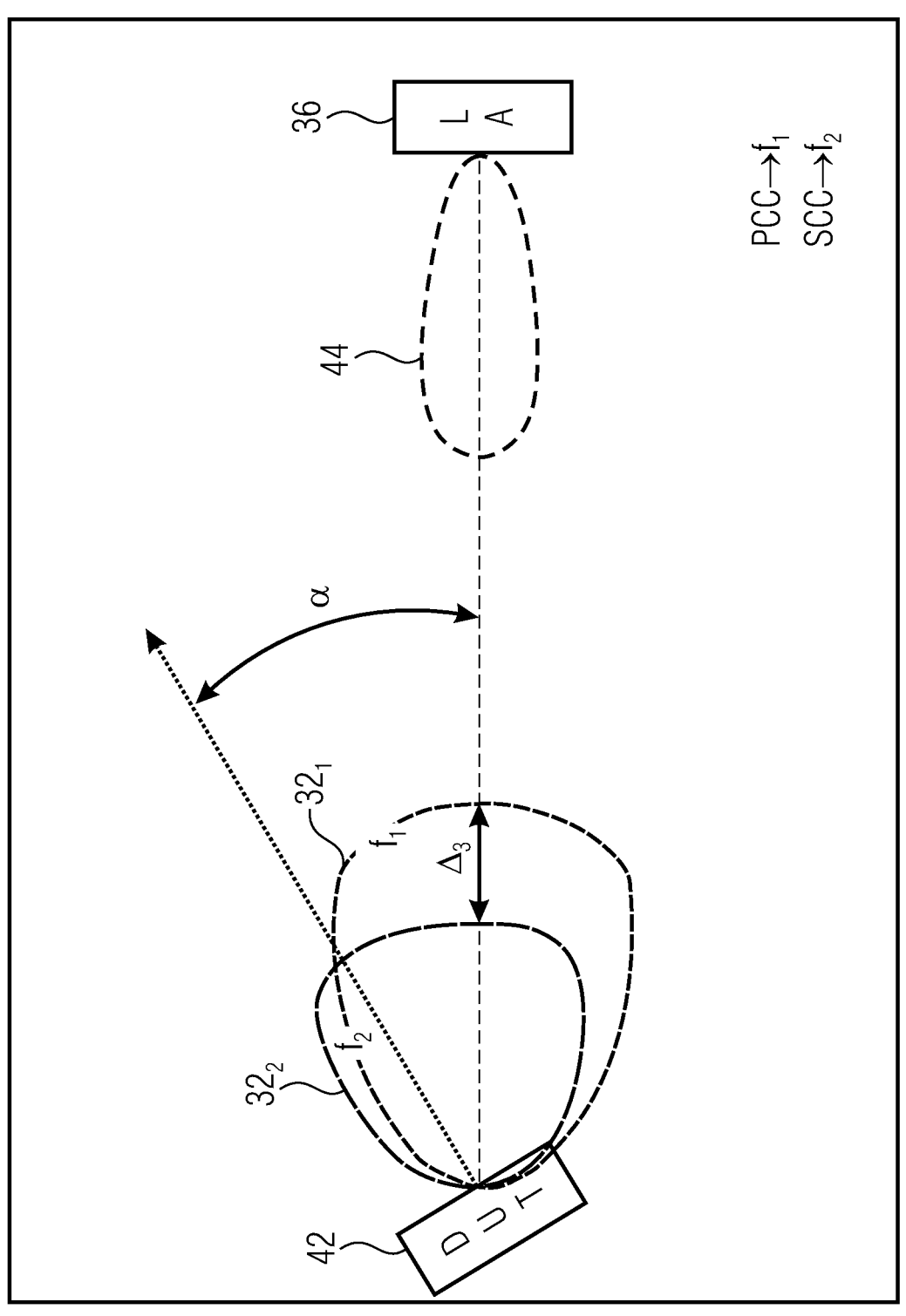

FIG. 20: A device-under-test (DUT) 42 is arranged so that its boresight points away from a link antenna (LA) by an angle of a degrees with respect to the LA—in this example the angle is 30°. The DUT 42 forms two antenna patterns, shown here in simplified form as main lobes or beams only. A first beam $32_1$ carries the primary component (PCC) using a first component carrier (CC1) operating at a frequency assignment of $f_1$ while a second beam $32_2$ carriers the secondary component carrier (SCC) using a second component carrier (CC2) operating at a frequency assignment of $f_2$. A shared or common beamformer is used to form the two antenna patterns comprising the PCC and SCC beams. The beamformer is arranged to direct these beams away from boresight by applying an incremental phase difference or phase gradient to the antenna elements that form the antenna array based on the operating frequency of the PCC, $f_1$. Therefore, and because the beams operate at different frequencies, the SCC beam will be misaligned or squinted with respect to the PCC beam. In addition to the effects of squinting, the strength of these beams may also be unequal. The link antenna of the measurement equipment is thus used to measure the EIRP of the PCC and SCC beams and to record their difference as $\Delta_3$.

Figure 21:
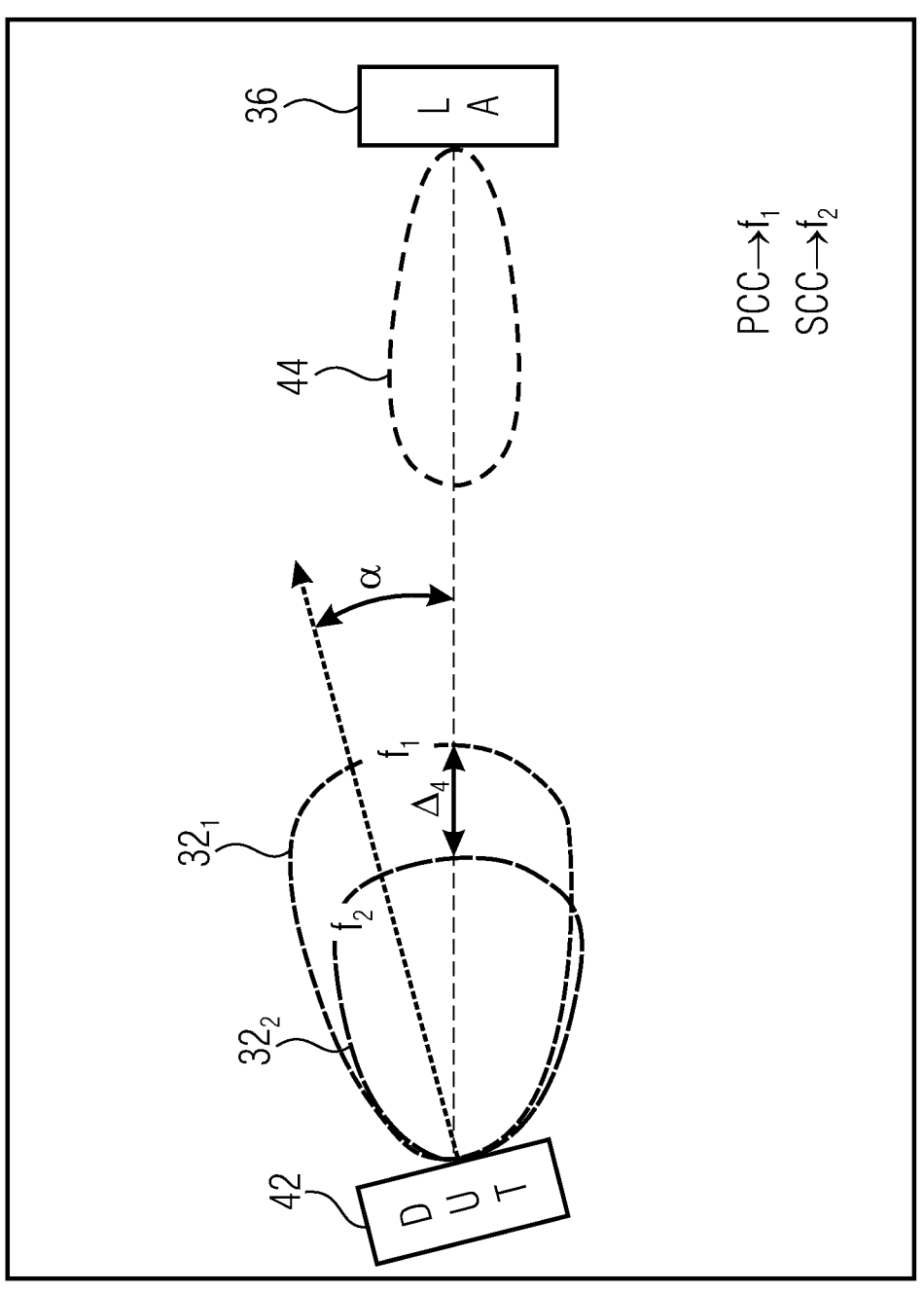

FIG. 21: A device-under-test (DUT) 42 is arranged so that its boresight points away from a link antenna (LA) by an angle of a degrees with respect to the LA—in this example the angle is 15°. The DUT 42 forms two antenna patterns, shown here in simplified form as main lobes or beams only. A first beam $32_1$ carries the secondary component (SCC) using a first component carrier (CC1) operating at a frequency assignment of $f_1$ while a second beam $32_2$ carriers the primary component carrier (SCC) using a second component carrier (CC2) operating at a frequency assignment of $f_2$. A shared or common beamformer is used to form the two antenna patterns comprising the PCC and SCC beams. The beamformer is arranged to direct these beams away from boresight by applying an incremental phase difference or phase gradient to the antenna elements that form the antenna array based on the operating frequency of the PCC, $f_2$. Therefore, and because the beams operate at different frequencies, the SCC beam will be misaligned or squinted with respect to the PCC beam. In addition to the effects of squinting, the strength of these beams may also be unequal. The link antenna of the measurement equipment is thus used to measure the EIRP of the PCC and SCC beams and to record their difference as $\Delta_4$.

Figure 22:
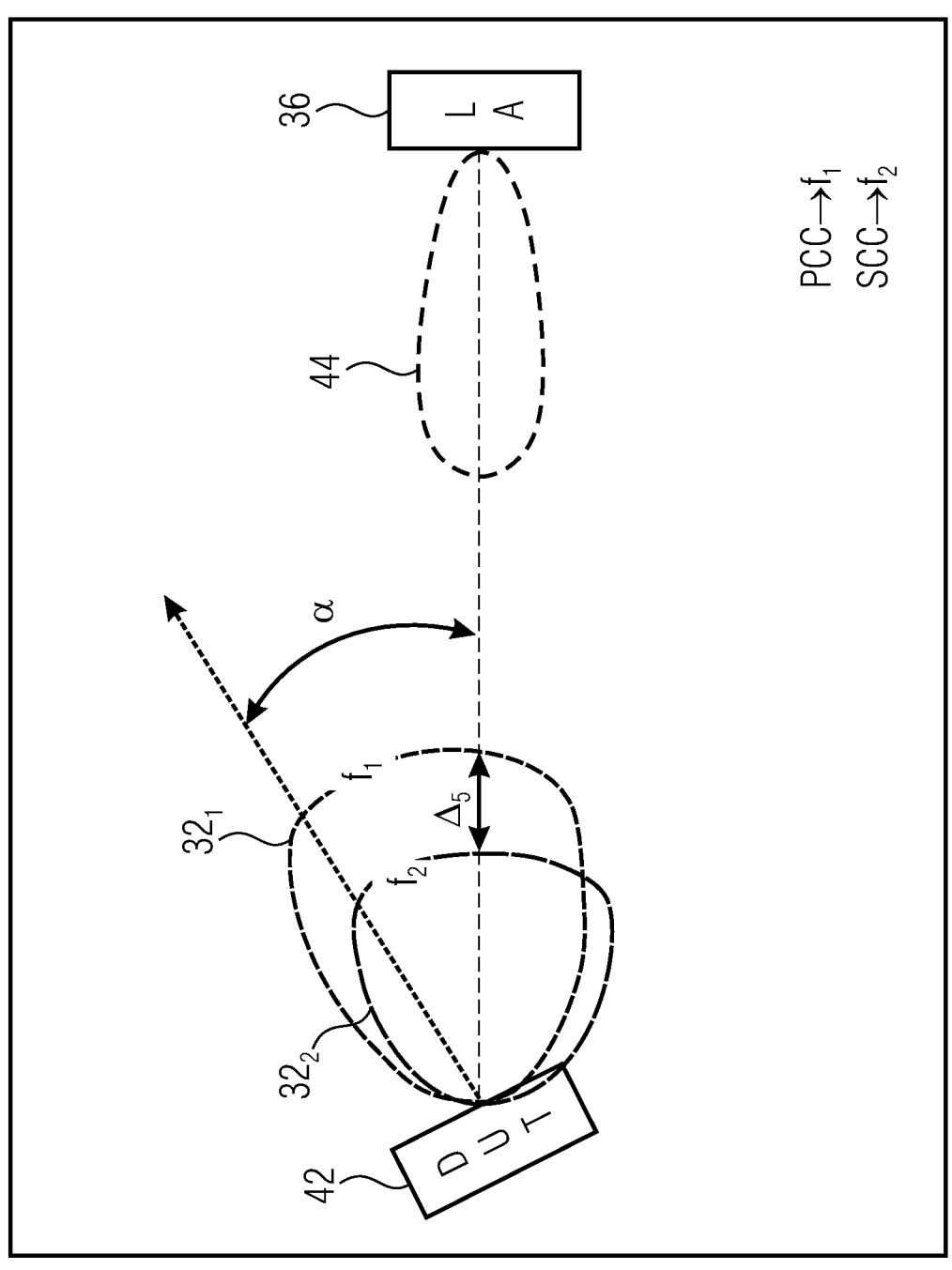

FIG. 22 shows a schematic scenario with the device-under-test (DUT) 42, e.g., a network node according to an embodiment is arranged so that its boresight points away from a link antenna (LA) 36 providing for a signal or beam 44 by an angle of a degrees with respect to the LA 36—in this example the angle is 30°. The DUT 42 forms two antenna patterns, shown here in simplified form as main lobes or beams only. A first beam $32_1$ carries the secondary component (SCC) using a first component carrier (CC1) operating at a frequency assignment of $f_1$ while a second beam 362 carriers the primary component carrier (SCC) using a second component carrier (CC2) operating at a frequency assignment of $f_2$. A shared or common beam-former is used to form the two antenna patterns comprising the PCC and SCC beams. The beamformer is arranged to direct these beams away from boresight by applying an incremental phase difference or phase gradient to the antenna elements that form the antenna array based on the operating frequency of the PCC, $f_2$. Therefore, and because the beams operate at different frequencies, the SCC beam will be misaligned or squinted with respect to the PCC beam. In addition to the effects of squinting, the strength of these beams may also be unequal. The link antenna of the measurement equipment is thus used to measure the EIRP of the PCC and SCC beams and to record their difference as $\Delta_5$.

Those differences may be determined, quantised and/or evaluated by use of the metrics described herein.

FIG. 23a shows an example summary of the examples presented in FIGS. 18 to 22.

FIG. 23b shows an example of the comparisons made from the measurements detailed in the table of FIG. 23a.

When referring again to the examples given in connection with FIG. 18 to FIG. 23b, specific embodiments are described in the following for illustrating different possibilities in using the advantages of the present invention. In the following, the invention is explained in view of the example of a beam correspondence procedure. For obtaining a dataset such as the second dataset a measurement procedure may be executed. Such an example measurement procedure may assess the properties and associated performance and/or conformance with a predefined test criterion of the so-called beam correspondence feature when applied in combination of carrier aggregation.

Therefore, the measurements may be understood as beam correspondence performance measurement improvements of frequency range 2, FR2, network node, e.g., UEs, using carrier aggregation, CA, and common or shared antenna arrays.

The FR2 mmWave bands may provide large swaths of spectrum, thus enabling high throughput links with data rates of multiple Gbps. The combination or aggregation of multiple component carriers (CC) is a feature supported for various band combinations including FR1+FR1, FR2+FR2 and FR1+FR2 (e.g. 900 MHz and 26 GHz). Particular candidate bands of interest for FR2+FR2 CA are 28 GHz and 39 GHz.

CA in FR2 is provided for high and low capability UEs alike. Since such UEs may use the same beamforming array and associated beamforming network when operating with aggregated CCs, the antenna array has to operate over a potentially broad span of frequencies. In FR2 inter-band CA for example, it is unlikely that optimal performance would be achievable for all CC combinations. This is because the beamforming weights are adjusted according to the operating frequency range of the Primary Component Carrier (PCC) and the distance to the range of frequencies used for operation of the Secondary Component Carrier (SCC) could be hundreds of megahertz apart.

For common beam management (CBM)), the UE above may assume that the transmitted signals from the serving cells should have the same downlink spatial domain transmission filter on one OFDM symbol in all CCs. This matches well with the assumption of quasi-colocation (QCL) in which all CCs are associated with the same gNB. Furthermore, the UE may use a common Rx/Tx antenna array for all CCs when performing uplink beamforming, thus making use of the same spatial filter or beamformer.

Current 3GPP Working Group RAN4 CA investigations show the effects of beams operating at different frequencies when using a common beamformer. For example, the SCC beam may be misaligned or squinted with respect to the PCC beam and may also have a different maximum EIRP. This could result in a potential degradation of SCC link performance.

In the example above, performance degradation is a function of the array properties and degrades according to an increase in: the electronic scan angle (ESA) measured with respect to boresight; the frequency separation between aggregated CCs; and the number of antenna elements that comprise the array. The latter is of particular importance for IAB networks where backhaul links may use a similar number of antenna elements for both uplink and downlink transmission.

The FIGS. 18-22 may be understood as representing snapshots during beam correspondence measurement procedure illustrating the effect of beam squinting and the associated change of a pattern property (in this context embodiments refer to the radiated power EIRP along the line towards the link antenna, LA).

When referring again to FIG. 18, the DUT 42 may be arranged so that its boresight points directly to the link antenna (LA) 36. The DUT may form the two antenna patterns as described. A PCC beam $32_1$ may use CC1 at a frequency $f_1$ while a SCC beam $32_2$ may use CC2 at $f_2$. A shared or common beamformer is used to form the two antenna patterns comprising the PCC and SCC beams. Even though the beams operate at different frequencies, the main lobes point in the same direction. However, as the strength of these beams may be unequal, the link antenna of the measurement equipment may be used to measure PCC and SCC EIRP, e.g., as a parameter of a dataset and may record their difference, $\Delta_1$.

When referring again to FIG. 19, the DUT 42 is arranged so that its boresight points away from LA 42 by an angle of a degrees with respect to the LA 42 in this example the angle is 15°. The DUT 42 may form the two antenna patterns $32_1$ and $32_2$, shown in simplified form as main lobes or beams only. The beamformer may be arranged to direct these beams away from boresight by applying an incremental phase difference to the antenna elements that form the antenna array based on the operating frequency of the PCC, $f_1$. Therefore, and because the beams operate at different frequencies, the SCC beam may be misaligned or squinted with respect to the PCC beam. In addition to the effects of squinting, the strength of these beams may also be unequal. The link antenna of the measurement equipment used to measure PCC and SCC EIRP may also record their difference, $\Delta_2$, e.g., as another parameter or as another datapoint of the same parameter.

At this stage different observations may be summarised:

Observation 1: In common beam management and when using a shared antenna array and beamformer together with aggregated component carriers (i.e., in carrier aggregation), beam squinting effects and EIRP differences in the uplink can create link performance imbalances.

In Common Beam Management (CBM), it is assumed that a given CC is the reference or so-called lead component carrier. Since this CC is used as the basis for beam management and/or beam correspondence purposes, additional CCs will be subjected to the same set of beamforming weights. Although the determination of these weights is implementation dependent, beam management (including beam correspondence) may nevertheless default to the PCC, thus providing a commonality of understanding between the gNB and the UE.

Observation 2: In CBM, the PCC is used as the reference for beam management and beam correspondence related decisions.

In practice, the mapping of the PCC and SCC to particular CCs is decided by the mobile network operator (MNO) at the network level with considerations towards, for example, gNB handovers that avoid PCC band switching. As a result of this, the (CA) PCC can be assumed to be the same for UEs served by a given gNB, either fully or in part.

Since UE beamforming is highly dynamic with respect to the angle between the boresight of the transmit array and the main direction of the uplink beam, the effect of beam squinting and the associated link performance imbalance may cause more severe link degradation and/or link quality fluctuations on the SCC link than observed on the PCC link.

In order to facilitate enhanced multi-link optimization between PCC and SCC, the lead component carrier used for beam management and/or beam correspondence should be chosen according to the load or throughput distribution on the component carriers that are used for the PCC and SCC. As an example, we assume that in a particular uplink transmission situation the SCC is allocated 4-10 times the throughput compared to the PCC. In this case, beam management and/or beam correspondence should follow the SCC as the lead component carrier in order to optimize the SCC link quality even though the link performance of the PCC is knowingly sacrificed.

Observation 3: In CBM, the lead component carrier used for beam management and/or beam correspondence purposes should be dynamically chosen between the component carriers assigned to PCC and SCC. Choices should match scheduling decisions made in connection with load balancing and the trade-off of aggregated link performance versus individual link performance.

It should be possible to quickly probe the performance of an individual link and/or to select the lead component carrier on a frame- or slot-basis. The established mechanisms of using RRC signalling to swap the PCC and SCC between CCs using are considered to be ineffectively slow.

Observation 4: Existing RRC signalling mechanisms used to change the CC assigned to PCC on a gNB are considered ineffectively slow since it is needed to rapidly change the lead component carrier used for beam management and/or beam correspondence purposes.

In consideration of the beforementioned effect of beam squinting on the link performance of component carriers operated in CA the following example of a measurement procedure is given.

When referring again to FIG. 18, the device-under-test (DUT) 42 is arranged so that its boresight points directly at a link antenna (LA). The DUT forms two antenna patterns 32$_1$ and 32$_2$, shown here in simplified form as main lobes or beams only. A first beam carries the primary component (PCC) using a first component carrier (CC1) operating at a frequency assignment of $f_1$ while a second beam carries the secondary component carrier (SCC) using a second component carrier (CC2) operating at a frequency assignment of $f_2$. A shared or common beamformer may be used to form the two antenna patterns 32$_1$ and 32$_2$ comprising the PCC and SCC beams. As the beamformer is arranged to direct these beams in a boresight direction, no incremental phase difference or phase gradient is applied to the antenna elements that form the antenna array. Therefore, even though the beams operate at different frequencies, the main lobes point in the same direction. However, as the strength of these beams may be unequal, the link antenna of the measurement equipment is used to measure PCC and SCC EIRP, e.g., as a parameter of a dataset and may record their difference as $\Delta_1$.

When referring again to FIG. 19, the DUT 42 may be arranged so that its boresight points away from a link antenna (LA) by an angle of a degrees with respect to the LA—in this example the angle is 15°. The DUT may form two antenna patterns, shown here in simplified form as main lobes or beams only. A first beam carries the primary component (PCC) using a first component carrier (CC1) operating at a frequency assignment of $f_1$ while a second beam carries the secondary component carrier (SCC) using a second component carrier (CC2) operating at a frequency assignment of $f_2$. A shared or common beamformer is used to form the two antenna patterns comprising the PCC and SCC beams. The beamformer is arranged to direct these beams away from boresight by applying an incremental phase difference or phase gradient to the antenna elements that form the antenna array based on the operating frequency of the PCC, $f_1$. Therefore, and because the beams operate at different frequencies, the SCC beam is, in the example, misaligned or squinted with respect to the PCC beam. In addition to the effects of squinting, the strength of these beams may also be unequal. The link antenna of the measurement equipment is thus used to measure the EIRP of the PCC and SCC beams and to record, for the dataset, their difference as $\Delta_2$.

When referring again to FIG. 20, the DUT 42 is arranged so that its boresight points away from a link antenna (LA) by an angle of a degrees with respect to the LA—in this example the angle is 30°. The DUT forms two antenna patterns, shown here in simplified form as main lobes or beams only. A first beam carries the primary component (PCC) using a first component carrier (CC1) operating at a frequency assignment of $f_1$ while a second beam carries the secondary component carrier (SCC) using a second component carrier (CC2) operating at a frequency assignment of $f_2$. A shared or common beamformer is used to form the two antenna patterns comprising the PCC and SCC beams. The beamformer is arranged to direct these beams away from boresight by applying an incremental phase difference or phase gradient to the antenna elements that form the antenna array based on the operating frequency of the PCC, $f_1$. Therefore, and because the beams operate at different frequencies, the SCC beam will be misaligned or squinted with respect to the PCC beam. In addition to the effects of squinting, the strength of these beams may also be unequal. The link antenna of the measurement equipment is thus used to measure the EIRP of the PCC and SCC beams and to record their difference as $\Delta_3$.

When referring again to FIG. 21, the DUT 42 is arranged so that its boresight points away from a link antenna (LA) by an angle of a degrees with respect to the LA—in this example the angle is 15°. The DUT forms two antenna patterns, shown here in simplified form as main lobes or beams only. A first beam carries the secondary component (SCC) using a first component carrier (CC1) operating at a frequency assignment of $f_1$ while a second beam carries the primary component carrier (SCC) using a second component carrier (CC2) operating at a frequency assignment of $f_2$. A shared or common beamformer is used to form the two antenna patterns comprising the PCC and SCC beams. The beamformer is arranged to direct these beams away from boresight by applying an incremental phase difference or phase gradient to the antenna elements that form the antenna array based on the operating frequency of the PCC, $f_2$. Therefore, and because the beams operate at different frequencies, the SCC beam will be misaligned or squinted with respect to the PCC beam. In addition to the effects of squinting, the strength of these beams may also be unequal. The link antenna of the measurement equipment is thus used to measure the EIRP of the PCC and SCC beams and to record their difference as $\Delta_4$.

When referring again to FIG. 22, the DUT 42 is arranged so that its boresight points away from a link antenna (LA) by an angle of a degrees with respect to the LA—in this example the angle is 30°. The DUT forms two antenna patterns, shown here in simplified form as main lobes or beams only. A first beam carries the secondary component (SCC) using a first component carrier (CC1) operating at a frequency assignment of $f_1$ while a second beam carries the primary component carrier (SCC) using a second component carrier (CC2) operating at a frequency assignment of $f_2$. A shared or common beamformer is used to form the two antenna patterns comprising the PCC and SCC beams. The beamformer is arranged to direct these beams away from boresight by applying an incremental phase difference or phase gradient to the antenna elements that form the antenna array based on the operating frequency of the PCC, $f_2$. Therefore, and because the beams operate at different frequencies, the SCC beam will be misaligned or squinted with respect to the PCC beam. In addition to the effects of squinting, the strength of these beams may also be unequal. The link antenna of the measurement equipment is thus used to measure the EIRP of the PCC and SCC beams and to record their difference as $\Delta_5$.

As described in connection with FIG. 23$a$ and FIG. 23$b$, the results being obtained in connection with the measurements $\Delta_i$, with i=1, . . . 5, wherein the example number of 5 neither provides for a minimum nor a maximum number of measurements. To the contrary, the number i may be any number of at least 1, at least 2, at least 3 or larger, e.g., at least 5, at least 10 or even more.

The prior description of the embodiment showed that the measured parameter may relate to a difference in radiated power.

This and/or other content of measurements may be related to each other and/or serve for further calculation, for the dataset itself and/or for the metric, e.g., for relating datasets. As an Example, Measurement Data Sets Associated Metrics are Described:

Metrics examples suitable to derive meaningful insights from measurements describe above will be given in the following to provide for illustrative but nevertheless not limiting examples. The purpose of the metric in the given example may be to evaluate the beam correspondence feature or comparing a multitude of wireless links operated by a network node/DUT (e.g., UE) in the field in a deployment scenario and/or in a measurement environment at the same time using one or a subset of the multiple links as reference for link optimization to be applied on the same or different links. In the above examples the reference component carrier (PCC) is optimized to point to the link antenna, while the second CC (SCC) is using the same antenna weights in the beamforming array may experience a misalignment of the main lobe with respect to the direction toward the link antenna.

While the measurement data may contain the measured received power at the LA 36 the measurement data can be organized like to be seen in the table shown in FIG. 24 showing an example summary of the examples presented in FIGS. 18 to 22.

In the example given, the rotation, the beamformer tuning, the PCC assignment, the SCC assignment and the EIRPs at $f_1$ and/or $f_2$ may be understood as parameters for which different values are obtained. Further values derived therefrom such as EIRP difference may serve as additional parameters but may also serve for the metric or forming the relationship. In the particular example one may be interested to know if the difference in received power at a particular angular geometry between the DUT and the LA has a dependency on which CC is chosen as PCC and therefore serves as reference for the beam correspondence feature to operate on.

That is, according to embodiments, the first dataset relates to a first beam pattern and the second dataset relates to a second beam pattern, wherein the first set of values and the second set of values represent different and corresponding measurement scenarios for the first beam pattern and the second beam pattern.

For example, one of the first parameter and the second parameter relate to at least one of:

a rotation of the device with respect to a link antenna;
a beamformer tuning
a primary component carrier, PCC, assignment
a secondary component carrier, SCC, assignment,
an equivalent isotropic radiated power, EIRP; and/or
values derived thereof.

As described in the example, relating the first dataset and the second dataset may comprise a decision if a value of the first dataset is smaller, larger or equal to a corresponding value of the second dataset, e.g., at different instances of measurements.

Alternatively or in addition, evaluating the behaviour may comprise a selection of a beam pattern related to the first dataset over a beam pattern related to the second dataset for transmission and/or reception purposes; or comprises a selection of a beam pattern related to the second dataset over a beam pattern related to the first dataset for transmission and/or reception purposes, as may be seen from FIG. 25.

FIG. 25 shows a schematic example table of comparisons made from the measurements detailed in the table of FIG. 24. The table of FIG. 25 provides some examples closely related to the data set from the measurements. Further insight can be obtained, for example, by evaluating the effect of such differences e.g. index no. 5 in the above table when calculating the resulting effect on e.g. an achievable throughput or data rate on each of the aggregated CCs. This can be done by putting the received signal strength (receive power) in relation to an assumed effective receiver noise resulting in a virtual signal-to-noise ratio (SNR) or when extended to interference to a signal to noise and interference ratio (SINR). The knowledge of a particular SNR or SINR in a particular resource block (RB) or bandwidth part (BWP) will allow the resulting performance of such link to be assessed when used in practice over a allocated bandwidth and an allocated modulation and coding scheme (MCS). When done for both links operated at $f_1$ and $f_2$ the associated data rates or throughput rates R1 and R2 can be calculated. Furthermore, different SNR and/or SINR can be chosen to cover different SNR regimes of interest given known path-loss situations from practical applications.

For the particular chosen imbalance assessment from index no-5 in the table above and forward calculation of associated data rates or throughput rates R1 and R2 we can derive a new metric describing the difference between the sum R1 plus R2 using PCC on ($f_1$) and the similar sum (R1+R2) using PCC on ($f_2$). If the difference is significant, e.g. 10% or more for a given SNR selection and bandwidth and MCS allocation per CC ($f_1$ and $f_2$) then this difference can be used as a threshold to make a decision with respect to the reference CC to be used for link optimization at a certain angle.

Therefore and based on a chosen metric a practical and meaningful decision criterion may be obtained thus allowing a choice between two options that aim to optimize the overall link performance (in this example, sum rate (R1+R2) is chosen to be maximized). However, other optimization criteria may be chosen, e.g., a delay, an overall service for all nodes, etc. That is, according to an embodiment, evaluating the behaviour which may relate or comprise a selection of a beam pattern to be formed to optimize link performance according to a criterion.

In a further step such virtual decisions could be aggregated over different angles between DUT and LA or over many band gaps between $f_1$ and $f_2$ e.g. using a CDF or PDF to represent a statistical property over e.g. the whole sphere. From such statistics a decision criterion/threshold for e.g. a conformance test passing may be derived.

One possible definition could be based on an evaluation of a CDF, representable as a plot of the sum rate difference to be less then X dB in Y % of the sphere.

Furthermore, this may be extended to say that the imbalance (dependency on which CC is PCC) should be below a certain threshold with the purpose to make sure that a definition of which frequency is to be used for PCC and SCC or which CC is used for link optimization does only an overall impact to the certain and well defined level on the sum rate (e.g. R1+R2).

An alternative option in analogy of the beam corresponding criterium as defined in 3GPP is that the criterium for the aggregated second component carrier can be defined with an additional margin e.g. X dB below a maxEIRP (maximum EIRP) on PCC in Y % of the CDF which results in X+X1 dB below the maxEIRP on SCC in Y+Y1% of the CDF. Another alternative is provided by the definition of a new Xnew dB in Ynew % for the weaker or for both CC operated in CA.

The terms "computer program medium" and "computer readable medium" are used to generally refer to tangible storage media such as removable storage units or a hard disk installed in a hard disk drive. These computer program products are means for providing software to a computer system. The computer programs, also referred to as computer control logic, are stored in main memory and/or secondary memory. Computer programs may also be received via the communications interface. The computer program, when executed, enables the computer system to implement the present invention. In particular, the computer program, when executed, enables processor to implement the processes of the present invention, such as any of the methods described herein. Accordingly, such a computer program may represent a controller of the computer system. Where the disclosure is implemented using software, the software may be stored in a computer program product and loaded into computer system using a removable storage drive, an interface, like communications interface.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for evaluating a behaviour of a communication device in view of an antenna pattern thereof, the method comprising:

receiving a first dataset representing a first set of values of at least two parameters relating to a first antenna pattern;

receiving a second dataset representing a second set of values of the at least two parameters relating to a second antenna pattern being formed by the communication device;

relating the first dataset and the second dataset using a metric to obtain a relationship as a result of the metric being applied; and evaluating the behaviour of the communication device using the relationship, wherein the evaluating the behaviour of the communication device is performed at least in part at:

the communication device;

a part of a test and measurement equipment;

a different node comprising information about the first antenna pattern and the second antenna pattern; or a network controller, wherein the evaluating the behaviour of the communication device is a basis of a selection of a beam pattern being formed to optimize a link performance existing between the communication device and another communication device according to a link performance criterion, and wherein the metric is based on at least one of:

a sample mean providing a first mean value of a parameter of the first dataset and a second mean value of the parameter of the second dataset, so as to relate the first mean value and the second mean value;

a sample variance providing a variance value of values of a parameter of the second dataset in relation to values of the parameter in the first dataset;

a sample standard variation providing a standard variation value of values of a parameter of the second dataset in relation to values of the parameter in the first dataset;

a distribution of a sample mean providing for a distribution value of values of the parameter compared to a mean value of the parameter;

a hypothesis testing;

a similarity measure providing for a similarity value indicating a similarity between the first dataset and the second dataset;

a dissimilarity measure providing for a dissimilarity value indicating a dissimilarity between the first dataset and the second dataset;

a distance measure providing for a distance value indicating a distance between the first dataset and the second dataset;

a probability distribution function (PDF);

a cumulative distribution function; or a complementary cumulative distribution function, or wherein the method further comprises matching a structure of at least one of the first dataset and the second dataset based on the metric so as to fit to a common data space or data structure prior to relating the first dataset and the second dataset, and wherein the matching the structure of the at least one of the first dataset and the second dataset comprises:

an adaptation of parameter value units of the first dataset to match parameter value units of the second dataset;

an adaptation of the parameter value units of the second dataset to match the parameter value units of the first dataset; or an adaptation of the parameter value units of the first dataset or the second dataset to commonly match the parameter value units of a third dataset.

2. The method of claim 1, wherein a first parameter and a second parameter of the at least two parameters relate to a same or a different physical quantity.

3. The method of claim 2, wherein the first dataset relates to a first beam pattern and the second dataset relates to a second beam pattern, and wherein the first set of values and the second set of values represent different and corresponding measurement scenarios for the first beam pattern and the second beam pattern.

4. The method of claim 3, wherein one of the first parameter and the second parameter relate to at least one of:

a rotation of the communication device with respect to a link antenna;

a beamformer tuning;

a primary component carrier (PCC) assignment;

a secondary component carrier (SCC) assignment;

an equivalent isotropic radiated power (EIRP); and values derived thereof.

5. The method of claim 1, wherein a first parameter and a second parameter of the at least two parameters relate to a same physical quantity, wherein the first parameter is related to a first property of the same physical quantity and wherein the second parameter is related to a second, different property of the same physical quantity.

6. The method of claim 1, wherein the first antenna pattern is generated by the communication device under a first condition, wherein the second antenna pattern is generated by the communication device under a second condition such that evaluating the behaviour comprises a consideration of a difference between the first condition and the second condition, and wherein the first condition or the second condition relates to at least one of an operating mode of the communication device, a battery level of the communication device, a relative localization or orientation of the communication device in space or wherein different conditions relate to at least one of different temperatures, different pressures and different magnetic fields.

7. The method of claim 1, further comprising:

receiving a dataset representing a third set of values of the at least two parameters relating to a third antenna pattern;

such that the metric is used to relate the first dataset, the second dataset and the third dataset to obtain the relationship.

8. The method of claim 1, wherein at least one of the at least two parameters is related to at least one of:

a width of the second antenna pattern;

a width of a main lobe of the second antenna pattern;

a width of a sidelobe of the second antenna pattern;

a width of a null of the second antenna pattern;

an absolute direction of at least a part of the second antenna pattern;

a relative direction of at least a part of the second antenna pattern; or a polarisation of at least a part of the second antenna pattern.

9. The method of claim 1, wherein the behaviour is evaluated in view of a first criterion of the link performance criterion using the metric as a first metric and in view of a second criterion of the link performance criterion using a second metric; or wherein the behaviour is evaluated in view of a same criterion using the first metric and using the second metric in combination.

10. The method of claim 1, wherein the first dataset is at least a part of a reference dataset; wherein relating the first dataset and the second dataset comprises a comparison between the first dataset and the second dataset;

such that the relationship comprises a comparison result; and such that evaluating the comparison result comprises a judging whether the communication device is in conformity with the reference dataset.

11. The method of claim 1, wherein the first antenna pattern is formed by the communication device such that the relationship indicates a comparison result between the first antenna pattern and the second antenna pattern of the communication device; and such that evaluating the behaviour comprises a judging whether to select the first antenna pattern or the second antenna pattern or a combination thereof for communication using the communication device.

12. The method of claim 1, wherein the evaluating the behaviour is performed at the network controller and is performed for a plurality of communication devices so as to orchestrate behaviours of the plurality of communication devices.

13. The method of claim 1, wherein the evaluating the behaviour is performed at a network and/or at a test equipment and communicated, as a feedback signal, to the communication device.

14. A device for evaluating a behaviour of a communication device in view of an antenna pattern thereof, the device comprising at least one processor and a memory storing a set of instructions, and the set of instructions, when executed by the at least one processor is configured to perform a method comprising:

receiving a first dataset representing a first set of values of at least two parameters relating to a first antenna pattern;

receiving a second dataset representing a second set of values of the at least two parameters relating to a second antenna pattern being formed by the communication device;

relating the first dataset and the second dataset using a metric to obtain a relationship as a result of the metric being applied; and evaluating the behaviour of the communication device using the relationship, wherein the evaluating the behaviour of the communication device is performed at least in part at:

the communication device;

a part of a test and measurement equipment;

a different node comprising information about the first antenna pattern and the second antenna pattern; or a network controller, wherein the evaluating the behaviour of the communication device is a basis of a selection of a beam pattern being formed to optimize a link performance existing between the communication device and another communication device according to a link performance criterion, and wherein the metric is based on at least one of:

a sample mean providing a first mean value of a parameter of the first dataset and a second mean value of the parameter of the second dataset, so as to relate the first mean value and the second mean value;

a sample variance providing a variance value of values of a parameter of the second dataset in relation to values of the parameter in the first dataset;

a sample standard variation providing a standard variation value of values of a parameter of the second dataset in relation to values of the parameter in the first dataset;

a distribution of a sample mean providing for a distribution value of values of the parameter compared to a mean value of the parameter;

a hypothesis testing;

a similarity measure providing for a similarity value indicating a similarity between the first dataset and the second dataset;

a dissimilarity measure providing for a dissimilarity value indicating a dissimilarity between the first dataset and the second dataset;

a distance measure providing for a distance value indicating a distance between the first dataset and the second dataset;

a probability distribution function (PDF);

a cumulative distribution function; or a complementary cumulative distribution function, or wherein the method further comprises matching a structure of at least one of the first dataset and the second dataset based on the metric so as to fit to a common data space or data structure prior to relating the first dataset and the second dataset, and wherein the matching the structure of the at least one of the first dataset and the second dataset comprises;

an adaptation of parameter value units of the first dataset to match parameter value units of the second dataset;

an adaptation of the parameter value units of the second dataset to match the parameter value units of the first dataset; or an adaptation of the parameter value units of the first dataset or the second dataset to commonly match the parameter value units of a third dataset.

* * * * *